US011138565B2

(12) United States Patent
Nakamura et al.

(10) Patent No.: US 11,138,565 B2
(45) Date of Patent: Oct. 5, 2021

(54) BILLING SERVER, SERVER CONTROL METHOD, AND SERVER CONTROL PROGRAM

(71) Applicant: N PLUS, INC., Tokyo (JP)

(72) Inventors: Yusuke Nakamura, Tokyo (JP); Yasunori Kanai, Tokyo (JP)

(73) Assignee: N PLUS, INC., Tokyo (JP)

( * ) Notice: Subject to any disclaimer, the term of this patent is extended or adjusted under 35 U.S.C. 154(b) by 0 days.

(21) Appl. No.: 16/643,461

(22) PCT Filed: Aug. 31, 2018

(86) PCT No.: PCT/JP2018/032486
§ 371 (c)(1),
(2) Date: Feb. 28, 2020

(87) PCT Pub. No.: WO2019/045073
PCT Pub. Date: Mar. 7, 2019

(65) Prior Publication Data
US 2020/0364670 A1    Nov. 19, 2020

(30) Foreign Application Priority Data
Aug. 31, 2017    (JP) .................... 2017-167656

(51) Int. Cl.
*G06Q 10/10* (2012.01)
*G06Q 30/04* (2012.01)
(Continued)

(52) U.S. Cl.
CPC .......... *G06Q 10/107* (2013.01); *G06Q 30/04* (2013.01); *H04L 12/28* (2013.01); *H04L 51/12* (2013.01); *H04L 51/28* (2013.01)

(58) Field of Classification Search
None
See application file for complete search history.

(56) References Cited

U.S. PATENT DOCUMENTS 6,260,024 B1 * 7/2001 Shkedy ............... G06Q 10/087
705/23
7,702,739 B1 * 4/2010 Cheng .................. H04L 67/327
709/207
(Continued)

FOREIGN PATENT DOCUMENTS

JP    2004013655 A    1/2004
JP    2004186888 A    7/2004
(Continued)

OTHER PUBLICATIONS

International Search Report and Written Opinion for related Int. App. PCT/JP2018/032486 dated Nov. 6, 2018. English translations provided; 15 pages.
(Continued)

*Primary Examiner* — Anh-Vinh T Nguyen
(74) *Attorney, Agent, or Firm* — Procopio, Cory, Hargreaves & Savitch LLP

(57) ABSTRACT

The objective of the present invention is to provide a billing server and the like capable of receiving email using the same address irrespective of whether or not an object is to be billed, and which can differentiate between and handle both situations. A billing server (4) according to the present invention comprises: a transmitting party acquiring unit (452) which detects that a mail server (6) has received an email, and acquires the transmitting party thereof; an information requesting unit (454) which requests the transmitting party to input price settlement information into a settlement server (5); a display changing unit (456) which, when a result receiving unit (455) has received a result to the effect that information has been provided, changes the display prior to the email being opened to a prescribed format; an operation detecting unit (458) which detects, by way of the mail server (6), an operation executed with respect to the email; and a settlement requesting unit (457) which, when
(Continued)

the result receiving unit (455) has received the result to the effect that information has been provided, and the operation detecting unit (458) has detected that a prescribed operation has been executed, requests the settlement server for a settlement.

8 Claims, 24 Drawing Sheets

(51) Int. Cl.
    *H04L 12/28*           (2006.01)
    *H04L 12/58*           (2006.01)

(56) References Cited

U.S. PATENT DOCUMENTS

| | | | | |
|---|---|---|---|---|
| 9,191,522 | B1* | 11/2015 | Krieger | H04M 15/51 |
| 9,760,871 | B1* | 9/2017 | Pourfallah | G06Q 20/3276 |
| 2004/0117358 | A1* | 6/2004 | von Kaenel | G06Q 40/08 |
| 2005/0049930 | A1* | 3/2005 | Sampark Padilla | G06Q 30/02 |
| | | | | 705/26.1 |
| 2005/0216380 | A1* | 9/2005 | Morris | H04M 15/8027 |
| | | | | 705/34 |
| 2007/0117538 | A1* | 5/2007 | Weiser | G06Q 20/10 |
| | | | | 455/406 |
| 2009/0181642 | A1* | 7/2009 | Bekanich | H04L 12/1428 |
| | | | | 455/406 |
| 2009/0254572 | A1* | 10/2009 | Redlich | G06Q 10/06 |
| 2010/0131385 | A1* | 5/2010 | Harrang | G06Q 30/0277 |
| | | | | 705/26.1 |
| 2011/0047221 | A1* | 2/2011 | Watanabe | H04L 67/30 |
| | | | | 709/206 |
| 2011/0258065 | A1* | 10/2011 | Fordyce, III | G06Q 10/10 |
| | | | | 705/26.1 |
| 2012/0136780 | A1* | 5/2012 | El-Awady | G06Q 20/14 |
| | | | | 705/40 |
| 2012/0239417 | A1* | 9/2012 | Pourfallah | G06Q 20/384 |
| | | | | 705/2 |
| 2015/0052009 | A1* | 2/2015 | Ketchell, III | G06Q 20/065 |
| | | | | 705/26.8 |
| 2015/0296021 | A1* | 10/2015 | Lee | H04M 1/72457 |
| | | | | 455/418 |
| 2016/0012433 | A1* | 1/2016 | Marenick | G06Q 20/4014 |
| | | | | 705/72 |
| 2016/0314501 | A1* | 10/2016 | Bartholomew | G06Q 30/0275 |
| 2017/0323335 | A1* | 11/2017 | Choi | G06F 3/048 |
| 2020/0188797 | A1* | 6/2020 | Joo | A63F 13/46 |
| 2020/0278816 | A1* | 9/2020 | Aoki | G06F 3/1243 |
| 2020/0402121 | A1* | 12/2020 | Karpas | G06Q 30/01 |

FOREIGN PATENT DOCUMENTS

| | | |
|---|---|---|
| JP | 2007324634 A | 12/2007 |
| JP | 2010218363 A | 9/2010 |

OTHER PUBLICATIONS

International Preliminary Report on Patentability for related Int. App. PCT/JP2018/032486 dated Mar. 3, 2020. English translation provided; 14 pages.

Office Action for related JP App. No. 2017-167656 dated Dec. 12, 2017. English translation provided; 6 pages.

\* cited by examiner

FIG. 4

| SENDER ADDRESS | LAST NAME | FIRST NAME |
|---|---|---|
| tohshi@foo.bar | TOHSHI | KIBOU |
| kim@hoge.jp | KIM | SHO |
| ... | ... | ... |

FIG. 5

| RECIPIENT ADDRESS | LAST NAME | FIRST NAME | RECIPIENT MAIL SERVER | SETTLEMENT TRIGGER | ACCESS TOKEN | SNS NAME | SNS ACCOUNT |
|---|---|---|---|---|---|---|---|
| madoka@foo.hoge | MADOKA | HIROSHI | mailsvr.hoo.hoge | OPENING | 1QZCLeaXQOQNt9z5 | t | @madoka |
| capital@hogehoge.fo | CAPITAL | TSUTOMU | msv.hogehoge.fo | REPLY | UQIHRd6mmzPcOn16 | f | capital |
| ... | ... | ... | ... | ... | ... | | |

FIG. 6

| SENDER ADDRESS | RECIPIENT ADDRESS |
|---|---|
| tohshi@foo.bar | capital@hogehoge.fo |
| kim@hoge.jp | madoka@foo.hoge |
| | |

FIG. 7

| MID | SENDER ADDRESS | RECIPIENT ADDRESS | COMPENSATION | BILLING PROCESS STATUS | MAIL PROCESS STATUS |
|---|---|---|---|---|---|
| 20171104236579@foo.bar | tohshi@foo.bar | madoka@foo.hoge | 500 | PAYABLE | UNREAD |
| 20170224242058.MAA24843@hoge.jp | kim@hoge.jp | capital@hogehoge.fo | 1000 | AWAITING REPLY | READ |
| | | | | | |

| FOLLOWER COUNT | POINTS | REFERENCE POINT CALCULATION METHOD |
|---|---|---|
| 0 | 0 | 0 FOLLOWERS × 0.03 = 0.03 |
| 10 | 0 | 10 FOLLOWERS × 0.03 = 0.3 |
| 100 | 3 | 100 FOLLOWERS × 0.03 = 3 |
| 1,000 | 30 | 1,000 FOLLOWERS × 0.03 = 30 |
| ... | ... | ... |
| 1,000,000 | 30,000 | 1,000,000 FOLLOWERS × 0.03 = 30,000 |
| 10,000,000 | 30,000 | SAME AS ABOVE (1,000,000 FOLLOWERS OR MORE ARE CALCULATED AS 1,000,000 FOLLOWERS) |

(b)

| MAIL RECEPTION NUMBER | POINTS | MAIL POINT CALCULATION METHOD |
|---|---|---|
| 0-9 | 0 | — |
| 10-19 | 11 | 10 MAILS × $(1.1)^{(10/10)}$ = 11 |
| 20-29 | 12 | 10 MAILS × $(1.1)^{(20/10)}$ = 12.1 |
| 30-39 | 13 | 10 MAILS × $(1.1)^{(30/10)}$ = 13.3 |
| ... | | |
| 100 | 26 | 10 MAILS × $(1.1)^{(100/10)}$ = 25.9 |
| 101- | 26 | SAME AS ABOVE (100 MAILS OR MORE ARE CALCULATED AS 100 MAILS) |

FIG. 15

| SUPPLY OF SETTLEMENT INFORMATION | SENDER | SUBJECT |
|---|---|---|
| ★ | KIBOU TOHSHI | PROPOSAL OF NEW BUSINESS MODEL |
|  | KIM SHOU | INVESTMENT REQUEST |
| ... | ... | ... |

FIG. 17

| SNS FOLLOWER COUNT F (FOLLOWERS) | FOLLOW-UP MAIL FREQUENCY (REPETITIONS) | FOLLOW-UP MAIL INTERVAL (DAYS) |
|---|---|---|
| $0 \leq F < 100$ | 1 | 2 |
| $100 \leq F < 1000$ | 2 | 4 |
| $1000 \leq F < 10000$ | 3 | 7 |
| $10000 \leq F$ | 4 | 7 |

FIG. 21

| SENDER ADDRESS | RECIPIENT ADDRESS | ADDITIONAL COST INFORMATION |
|---|---|---|
| tohshi@foo.bar | madoka@foo.hoge | 100 |
| kim@hoge.jp | - | 0 |
| ... | ... | ... |

BILLING SERVER, SERVER CONTROL METHOD, AND SERVER CONTROL PROGRAM

CROSS-REFERENCE TO RELATED APPLICATIONS

This application is a U.S. National Stage entry of PCT Application No: PCT/JP2018/032486 filed on Aug. 31, 2018, which claims priority to Japanese Patent Application No. 2017-167656, filed Aug. 31, 2017, the contents of which are incorporated herein by reference.

FIELD

The present invention relates to a billing server, a server control method, and a server control program.

BACKGROUND

With the spread of email, recipients often receive a large number of emails, and technological developments corresponding thereto are being made continuously.

For example. Patent Literature 1 describes, in an email service in which the receiving side pays a fee, an email billing system in which only the email charge for a specific user, exemplified by a celebrity or advisor, is borne by the sender. In the invention of Patent Literature 1, the email sender obtains payment ticket information and transmits an email with the obtained ticket information attached. The email billing system transmits email with ticket information attached to the recipient and changes the billing destination from the recipient of the email to the sender, and performs processing such as discarding emails without ticket information attached without transmitting.

CITATION LIST

Patent Literature

[PTL 1] Japanese Unexamined Patent Publication (Kokai) No. 2004-186888

SUMMARY

In the invention of Patent Literature 1, since emails without ticket information attached are discarded, it is not possible to receive and process billable and non-billable emails with the same email address.

The present disclosure aims to solve such conventional problems, and an object of the present disclosure is to provide a billing server, server control method, and server control program with which emails, regardless of whether they are billable or not, can be received at the same address and treated separately.

A billing server according to the present disclosure includes a sender acquisition unit which detects that a mail server has received an email and acquires a sender of the email, a compensation determination unit which determines compensation to be requested from the sender, an information requisition unit which requests that the sender input information necessary for settlement of the compensation to a settlement server, a results reception unit which receives result of the request for information, a display changing unit which controls the mail server to change a display prior to opening of the email to a predetermined display format when the results reception unit receives result indicating that the information has been supplied, an operation detection unit which detects, via the mail server, opening of the email or an operation executed on the email after opening, and a settlement requisition unit which requests that the settlement server execute the settlement when the results reception unit receives result indicating that the information has been supplied and the operation detection unit detects that the predetermined operation has been executed.

It is preferable for a billing server according to the present disclosure to further include a billing exclusion individuals registration unit which registers, based on a request by a recipient of the email, the sender and the recipient as a pair wherein the information requisition unit excludes emails having a sender and recipient pair identical to the pair registered by the billing exclusion individuals registration unit from the request for information necessary for the settlement of the compensation.

It is preferable for a billing server according to the present disclosure that the results reception unit receives, via the settlement server, requests of the request for information necessary for the settlement of the compensation.

It is preferable for a billing server according to the present disclosure that the compensation determination unit calculates the compensation based on an SNS follower count of the recipient of the email or a number of prior emails received by the recipient of the email.

It is preferable for a billing server according to the present disclosure that the settlement requisition unit further receives a settlement response indicating execution of the settlement from the settlement server, the billing server further including: a judgment unit which judges whether a reply mail to the email has been transmitted by the recipient of the email by a predetermined time, and a follow-up unit which transmits a follow-up mail which prompts a reply to the email, to the recipient when the settlement response has been received, the predetermined operation is opening of the email and the reply mail has not been transmitted by the recipient by the predetermined time.

It is preferable for a billing server according to the present disclosure that the follow-up unit determines at least one of a frequency and interval of transmission of the follow-up mail based on an SNS follower count of the recipient.

It is preferable for a billing server according to the present disclosure to further including an additional cost information acquisition unit which acquires additional cost information representing a cost paid by the sender of the email for the transmission of the follow-up email, wherein the compensation determination unit determines the compensation to be requested from the sender based on at least one of a compensation amount set by the recipient of the email and a compensation amount calculated by the compensation determination unit, and a cost corresponding to the additional cost information.

A server control method according to the present disclosure includes detecting that a mail server has received an email and acquiring a sender of the email, determining compensation to be requested from the sender, requesting that the sender input information necessary for settlement of the compensation to a settlement server, receiving result of the request for information, controlling the mail server to change a display prior to opening of the email to a predetermined display format when result indicating that the information has been supplied is received, detecting, via the mail server, opening of the email or an operation executed on the email after opening, and requesting that the settlement server execute the settlement when result indicating that the information has been supplied is received and it is detected that the predetermined operation has been executed.

A server control program according to the present disclosure controls the server to detect that a mail server has received an email and acquires a sender of the email, determine compensation to be requested from the sender, request that the sender input information necessary for settlement of the compensation to a settlement server, receive result of the request for information, control the mail server to change a display prior to opening of the email to a predetermined display format when result indicating that the information has been supplied is received, detect, via the mail server, opening of the email or an operation executed on the email after opening, and request that the settlement server execute the settlement when result indicating that the information has been supplied is received and it is detected that the predetermined operation has been executed.

According to the present disclosure, email recipients can receive emails, regardless of whether they are billable or not, at the same address and treat them separately.

BRIEF DESCRIPTION OF DRAWINGS

FIG. 4 is a view showing an example of a sender table stored in a storage unit 44.

FIG. 5 is a view showing an example of a recipient table stored in the storage unit 44.

FIG. 6 is a view showing an example of a billing exclusion table stored in the storage unit 44.

FIG. 7 is a view shoeing an example of a message table stored in the storage unit 44.

FIG. 13(A)-(B) is a view showing an example of a compensation determination method by the billing server 4.

FIG. 15 is a view showing an example of an email list screen displayed on the terminal 7.

FIG. 17 is a view showing an example of a follow-up frequency table according to the first modification.

FIG. 21 is a view showing an example of an additional cost table according to the second modification.

DESCRIPTION OF EMBODIMENTS

Figure 1:
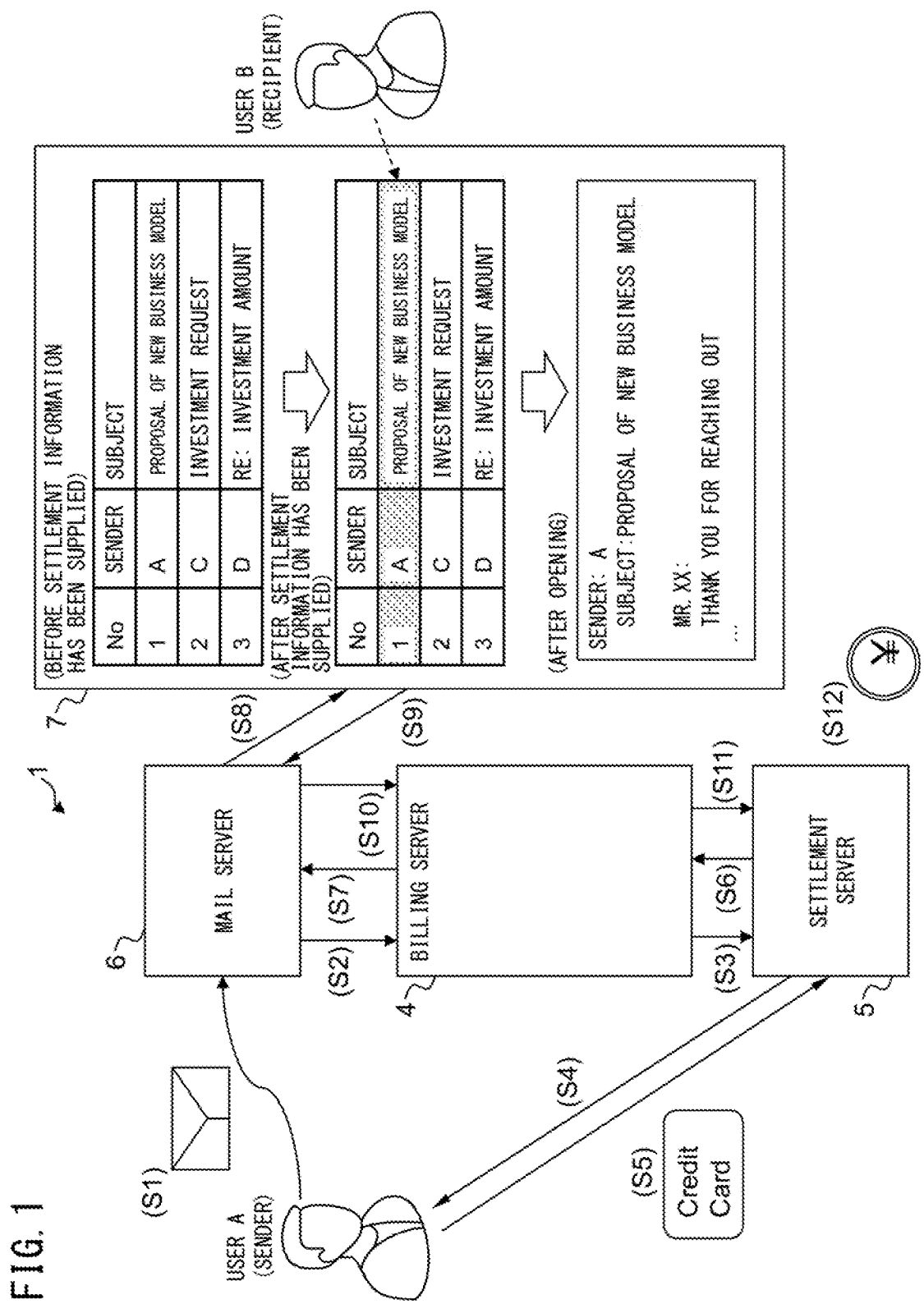
FIG. 1 is a view showing an example of an overview of processing of a billing system 1.

The various embodiments of the present invention will be described below while referring to the drawings. However, it should be noted that the technical scope of the present invention is not limited to these embodiments, but extends to the inventions described in the claims and the equivalents thereof.

FIG. 1 is a view showing an example of an overview of the processing of the billing system 1. The billing system 1 comprises a billing server 4, a settlement server 5, a mail server 6, and a terminal 7, etc. A summary of the processing from the transmission of an email until the changing of the display of a billing target email prior to opening to a predetermined display format and the execution of settlement by the settlement server 5 will be described below.

Initially, the mail server 6 receives an email addressed to user B transmitted by the sender (hereinafter referred to as user A) of the email (S1). Next, the billing server 4 acquires header information from the email received by the mail server 6 (S2), and judges whether compensation for user B to process the email should be requested from user A based on predetermined criteria. When compensation is to be requested, the billing server 4 requests, via the settlement server 5, that the user A input, into the settlement server 5, information (settlement information) necessary for settlement of the compensation for the user B to process the email (S3, S4).

The billing server 4 detects (S6), via the settlement server 5, that the settlement information has been input to the settlement server 5 from the user A (S5), and controls the mail server 6 so as to change the display of the email prior to opening to a predetermined display format (S7). The mail server 6 sets the display of the email in the email list screen in bold with highlighting in accordance with the control of the billing server 4.

The user B receives from the mail server 6, using the terminal 7, a list of transmitted emails addressed to user B (S8). When the received email list is displayed on the terminal 7, emails for which settlement information has been input to the settlement server 5 are displayed in bold with highlighting. When user B opens an email displayed in bold with highlighting, the billing server 4 detects the opening via the mail server 6 (S9. S10), and requests that the settlement server 5 execute settlement based on the settlement information received in S4 (S11). The settlement server 5 executes settlement based on the request of the billing server 4 (S12). Due to the foregoing, the processing from the transmission of the email to the changing of the display prior to opening of the billing target email to the predetermined display format and the execution of settlement by the settlement server 5 is complete.

Figure 2:
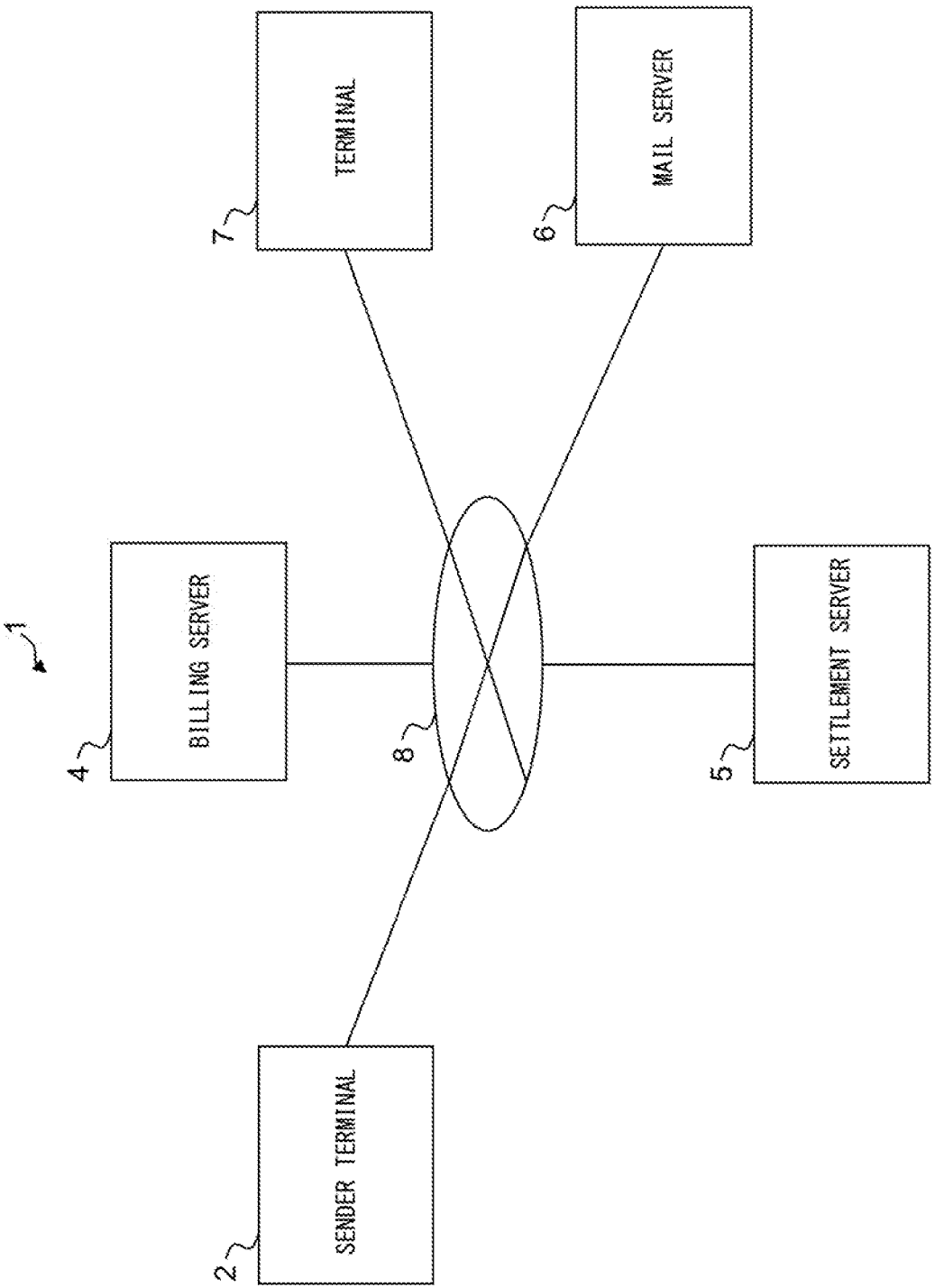
FIG. 2 is a view showing an example of the schematic structure of the billing system 1.

FIG. 2 is a view showing an example of the schematic structure of the billing system 1.

The billing system 1 comprises a sender terminal 2, the billing server 4, the settlement server 5, the mail server 6, and the terminal 7. The servers and terminals are connected via a communication network 8 such as the internet.

The sender terminal 2 transmits emails addressed to user B (email recipient) to the mail server 6 and transmits information necessary for the settlement of the compensation for the user B to process the email to the settlement server 5 in accordance with the request from the billing server 4 or the settlement server 5. Though the sender terminal 2 is a multi-functional mobile phone (so-called "smartphone"), the sender terminal 2 may be, for example, a communication device such as a mobile information terminal (Personal Digital Assistant (PDA)) or tablet PC.

The settlement server 5 is a server which provides settlement services. Though the settlement server 5 is a server which provides credit card settlement services in the present embodiment, the settlement server 5 may be a server which provides other settlement services or online settlement services, such as bank net settlement or mobile carrier settlement. Furthermore, a plurality of servers may cooperate to provide the functions of the settlement server 5.

Figure 3:
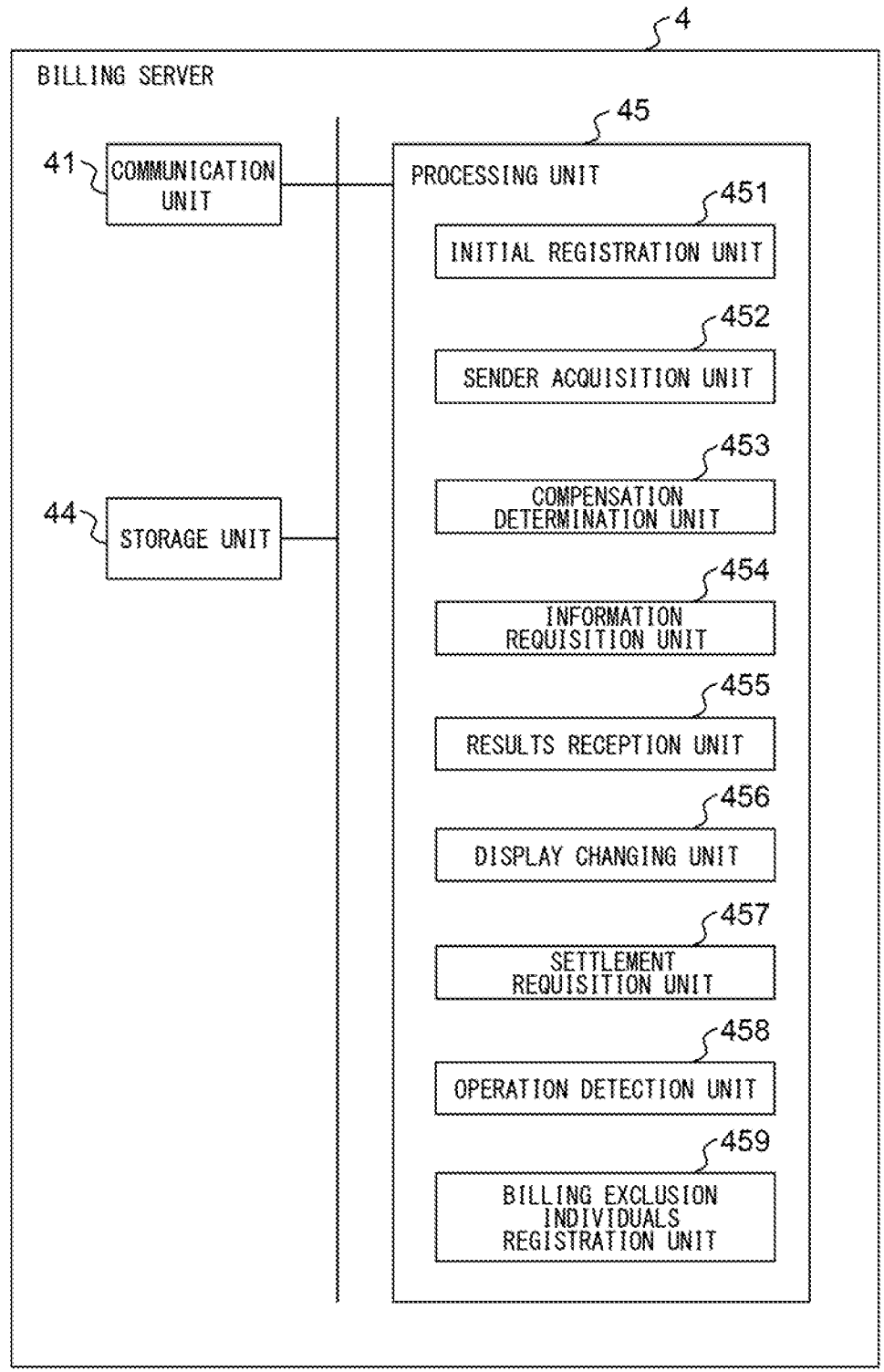
FIG. 3 is a view showing an example of the schematic structure of a billing server 4.

FIG. 3 is a view showing an example of the schematic structure of the billing server 4.

The billing server 4 detects the arrival of an email addressed to user B in the mail server 6, and requests that user A (email sender) supply settlement information of compensation for the user B to process the email to the settlement server 5. When result indicating that the settlement information has been supplied to the settlement server 5, the billing server 4 controls the mail server 6 so as to change the display of the email prior to opening to a predetermined display format. For this purpose, the billing server 4 comprises a communication unit 41, a storage unit 44, and a processing unit 45.

The communication unit 41 has a wired communication interface circuit such as Ethernet™. The communication unit 41 performs communication with the settlement server 5, the mail server 6, and the terminal 7 via the communication network 8. The communication unit 41 supplies data received from the settlement server 5, the mail server 6, and the terminal 7, etc., to the processing unit 45. The communication unit 41 transmits data supplied from the processing unit 45 to the settlement server 5, the mail server 6, and the terminal 7, etc.

The storage unit 44 comprises, for example, at least one of semiconductor memory, a magnetic disk device, and an optical disk device. The storage unit 44 stores driver programs, operating system programs, application programs, and data, etc., used for processing by the processing unit 45.

For example, the storage unit 44 stores a communication device driver program for controlling the communication unit 41, etc., as a driver program. Furthermore, the storage unit 44 stores a connection control program by a communication method such as TCP/IP (Transmission Control Protocol/Internet Protocol), etc., as an operating system program. The storage unit 44 stores a data processing program for the transmission and reception of various data, etc., as an application program. The computer programs may be installed in the storage unit 44 from a known computer readable portable recording medium such as a CD-ROM (Compact Disk Read Only Memory) or DVD-ROM (Digital Versatile Disk Read Only Memory), using a well-known setup program, etc.

The processing unit 45 comprises one or a plurality of processors and peripheral circuits thereof. The processing unit 45 comprehensively controls the entirety of the operations of the billing server 4, and is, for example, a CPU (Central Processing Unit). The processing unit 45 controls the operations of the communication unit 41 so that the various processes of the billing server 4 are executed in the appropriate order in accordance with the programs stored in the storage unit 44. The processing unit 45 executes processes based on the programs (driver programs, operating system programs, application programs, etc.) stored in the storage unit 44. Furthermore, the processing unit 45 can execute a plurality of programs (application programs, etc.) in parallel.

The processing unit 45 comprises an initial registration unit 451, a sender acquisition unit 452, a compensation determination unit 453, an information requisition unit 454, a results reception unit 455, a display changing unit 456, a settlement requisition unit 457, an operation detection unit 458, and a billing exclusion individuals registration unit 459. The units included in the processing unit 45 are functional modules implemented by programs executed by the processor of the processing unit 45. Alternatively, the units included in the processing unit 45 may be implemented in the billing server 4 as independent integrated circuits, microprocessors, or firmware.

FIG. 4 is a view showing an example of a sender table stored in the storage unit 44.

As shown in FIG. 4, a sender address and sender first and last names are stored in the sender table in association with each other for each email sender. The sender address is the email address of the sender.

FIG. 5 is a view showing an example of a recipient table stored in the storage unit 44.

As shown in FIG. 5, a recipient address, recipient first and last names, the email server used by the recipient, a settlement trigger, an access token, SNS name, and SNS accounts are stored in a recipient table in association with each other for each email recipient. The recipient address is the email address of the recipient. The settlement trigger is information representing an email operation by which the settlement server 5 is triggered to execute settlement, and the settlement trigger includes opening of a settlement target email and replying to a settlement target email.

The access token is a character string supplied from the mail server 6 when the email recipient email logs in to the mail server 6 by specifying a user name and a password, and is a character string used for authentication of processing performed on the mail server 6.

SNS name is the title of the SNS used by the email recipient. SNS account is the account name used by the email recipient on the SNS indicated by the SNS name.

In the present embodiment, the email address is stored in the sender stable when joining the system as a sender, and the email address is stored in the recipient table when joining the system as a recipient. Thus, when the billing system 1 is joined, the user can select from three methods including (1) joining as a sender but not as a recipient, (2) joining as a recipient but not as a sender, and (3) joining as a sender and a recipient.

FIG. 6 is a view showing an example of a billing exclusion table stored in the storage unit 44.

As shown in FIG. 6, a sender address and recipient address are stored in the billing exclusion table in association with each other. The billing exclusion table shows individuals for whom the billing server 4 does not request compensation (does not bill) for emails transmitted from the sender address registered in this table to the recipient address.

FIG. 7 is a view showing an example of a message table stored in the storage unit 44.

As shown in FIG. 7, an MID (message ID) which can uniquely identify an email, the sender address, the recipient address, the compensation, the billing process status, and the mail process status are stored in association with each other in the message table. The compensation represents the compensation for the email recipient to perform a predetermined operation on the email, and the predetermined operation is, for example, opening or replying to the email. The billing process status is information representing the progress of the billing process for the email indicated by the MID, and is represented by attribute values such as "not requested", "waiting for reply", "payable", "not payable", "paid", and "unpaid." The mail process status is information indicating the status of the email indicated by the MID, and is represented by attribute values that correspond to settlement triggers in the recipient table such as "opened" and "replied", and other attribute values such as "unopened."

Figure 8:
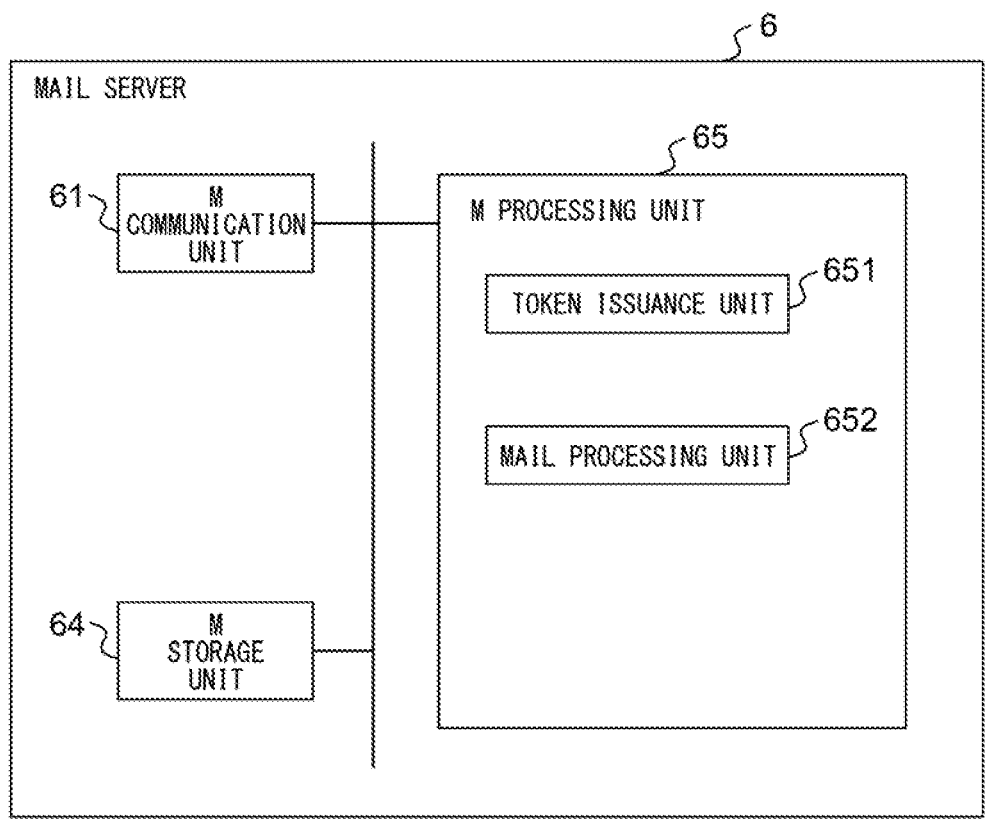
FIG. 8 is a view showing an example of the schematic structure of a mail server 6.

FIG. 8 is a view showing an example of the schematic structure of the mail server 6.

The mail server 6 receives emails, and enables the recipient of the email to reference the received email from the terminal 7, etc. The mail server 6 supplies the arrival status of the email to the billing server 4 in accordance with a request from the billing server 4, changes the display format of the email prior to opening, and supplies the status of the received email to the billing server 4. For this purpose, the mail server 6 comprises an M communication unit 61, an M storage unit 64, and an M processing unit 65.

The M communication unit 61 includes a wired communication interface circuit such as Ethernet™. The M communication unit 61 communicates with the sender terminal 2, the billing server 4, and the terminal 7 via the communication network 8. Further, the M communication unit 61 provides data received from the sender terminal 2, the billing server 4, and the terminal 7, etc., to the M processing unit 65. Furthermore, the M communication unit 61 transmits the data supplied from the M processing unit 65 to the sender terminal 2, the billing server 4, and the terminal 7, etc.

The M storage unit 64 includes at least one of, for example, a semiconductor memory, a magnetic disk device, and an optical disk device. The M storage unit 64 stores driver programs used by the M processing unit 65 for processing, operating system programs, application programs, and data.

For example, the M storage unit 64 stores a communication device driver program for controlling the M communication unit 61, etc., as a driver program. Furthermore, the M storage unit 64 stores a connection control program by a communication method such as TCP/IP (Transmission Control Protocol/Internet Protocol), etc., as an operating system program. The M storage unit 64 stores a data processing program for the transmission and reception of various data, etc., as an application program. The computer programs may be installed in the M storage unit 64 from a known computer readable portable recording medium such as a CD-ROM or DVD-ROM, using a well-known setup program, etc.

The M processing unit 65 comprises one or a plurality of processors and peripheral circuits thereof. The M processing unit 65 comprehensively controls the entirety of the operations of the mail server 6, and is, for example, a CPU. The M processing unit 65 controls the operations of the M communication unit 61, etc., so that the various processes of the mail server 6 are executed in the appropriate order in accordance with the programs stored in the M storage unit 64. The M processing unit 65 executes processes based on the programs (driver programs, operating system programs, application programs, etc.) stored in the M storage unit 64. Furthermore, the M processing unit 65 can execute a plurality of programs (application programs, etc.) in parallel.

The M processing unit 65 includes a token issuance unit 651 and a mail processing unit 652, etc. The units included in the M processing unit 65 are functional modules implemented by programs executed by the processor of the M processing unit 65. Alternatively, the units included in the M processing unit 65 may be implemented in the mail server 6 as independent integrated circuits, microprocessors, or firmware. The various units such as the token issuance unit 651 and the mail processing unit 652 use a communication protocol such as HTTP (Hyper Text Transfer Protocol) when services are provided to the terminal 7.

Figure 9:
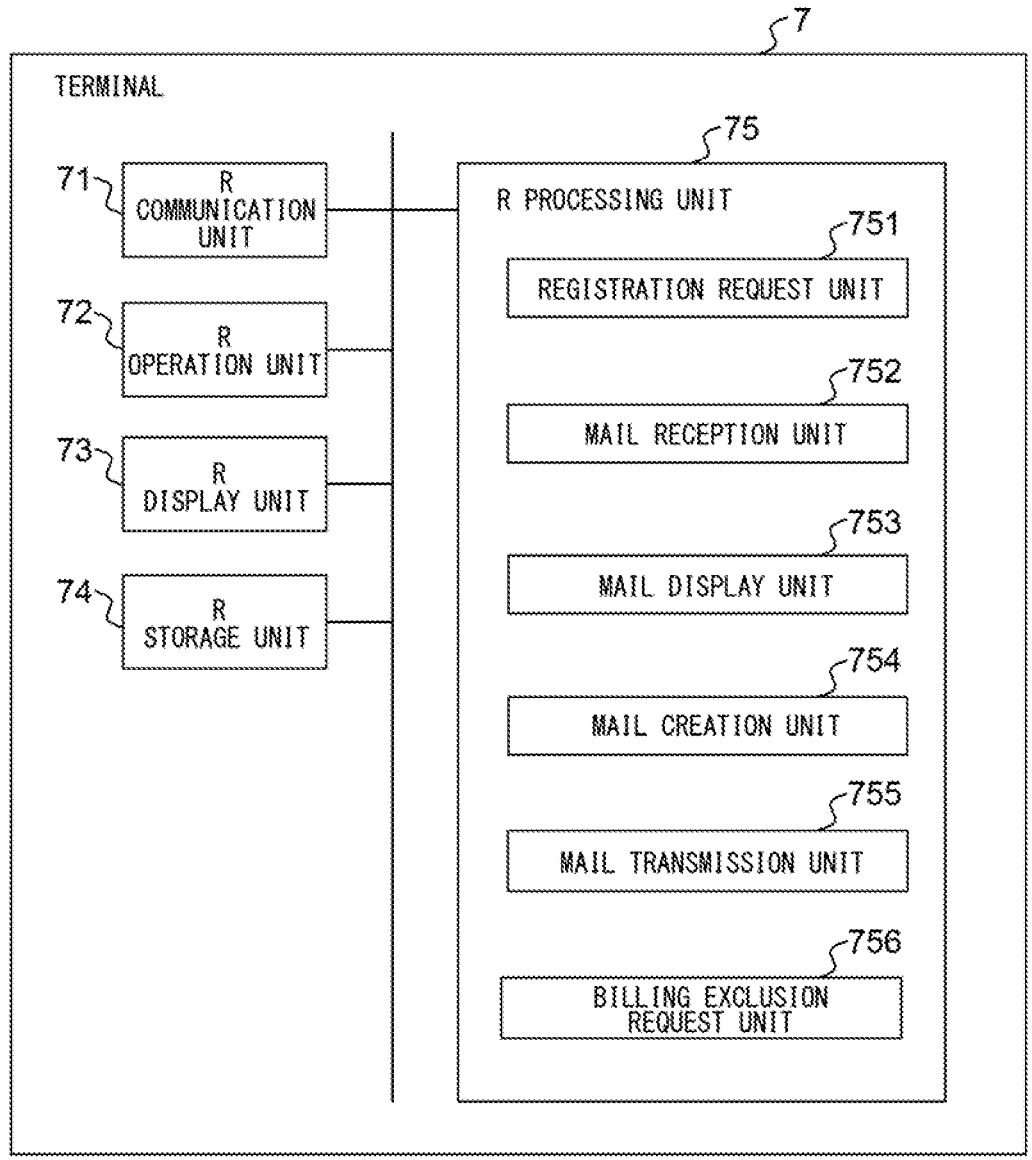
FIG. 9 is a view showing an example of the schematic structure of a terminal 7.

FIG. 9 is a view showing an example of the schematic structure of the terminal 7.

The terminal 7 receives and displays emails which have arrived at the mail server 6. The terminal 7 performs operations such as replying to the received email. For this purpose, the terminal 7 comprises an R communication unit 71, an R operation unit 72, an R display unit 73, an R storage unit 74, and an R processing unit 75.

The R communication unit 71 includes a wired communication interface circuit such as Ethernet™. The R communication unit 71 communicates with the billing server 4 and the mail server 6, etc., via the communication network 8. Further, the R communication unit 71 provides data received from the billing server 4 and the mail server 6, etc., to the R processing unit 75. Furthermore, the R communication unit 71 transmits the data supplied from the R processing unit 75 to the billing server 4 and the mail server 6, etc.

The R operation unit 72 may be any type of device as long as it is capable of performing the operations of the terminal 7, and may be, for example, a keyboard, mouse, or touchpad. Using this device, a user can input characters and number, and can select from menus. The R operation unit 72 receives user instructions, generates signals corresponding to the received instructions, and outputs the signals to the R processing unit 75.

The R display unit 73 may be any type of device as long as it is capable of outputting images, and may be, for example, a touch panel display device, a liquid crystal display, an organic EL (Electro-Luminescence) display, or a CRT (Cathode Ray Tube) display. The R display unit 73 displays images in accordance with data supplied from the R processing unit 75.

The R storage unit 74 includes at least one of, for example, semiconductor memory, a magnetic disk device, and an optical disk device. The R storage unit 74 stores driver programs used by the R processing unit 75 for processing, operating system programs, application programs, and data, etc.

For example, the R storage unit 74 stores a communication device driver program for controlling the R communication unit 71, etc., as a driver program. Furthermore, the R storage unit 74 stores a connection control program by a communication method such as TCP/IP (Transmission Control Protocol/Internet Protocol), etc., as an operating system program. The R storage unit 74 stores a data processing program for the transmission and reception of various data, etc., as an application program. The computer programs may be installed in the R storage unit 74 from a known computer readable portable recording medium such as, for example, a CD-ROM or DVD-ROM, using a well-known setup program.

The R processing unit 75 comprises one or a plurality of processors and peripheral circuits thereof. The R processing unit 75 comprehensively controls the entirety of the operations of the terminal 7, and is, for example, a CPU (Central Processing Unit). The R processing unit 75 controls the operations of the R communication unit 71 so that the various processes of the terminal 7 are executed in the appropriate order in accordance with the programs stored in the R storage unit 74. The R processing unit 75 executes processes based on the programs (driver programs, operating system programs, application programs, etc.) stored in the R storage unit 74. Furthermore, the R processing unit 75 can execute a plurality of programs (application programs, etc.) in parallel.

The R processing unit 75 includes a registration request unit 751, a mail reception unit 752, a mail display unit 753, a mail creation unit 754, a mail transmission unit 755, and a billing exclusion request unit 756, etc. The units included in the R processing unit 75 are functional modules implemented by programs executed by the processor of the R processing unit 75. Alternatively, the units included in the R processing unit 75 may be implemented in the terminal 7 as independent integrated circuits, microprocessors, or firmware.

<1. Initial Registration>

Figure 10:
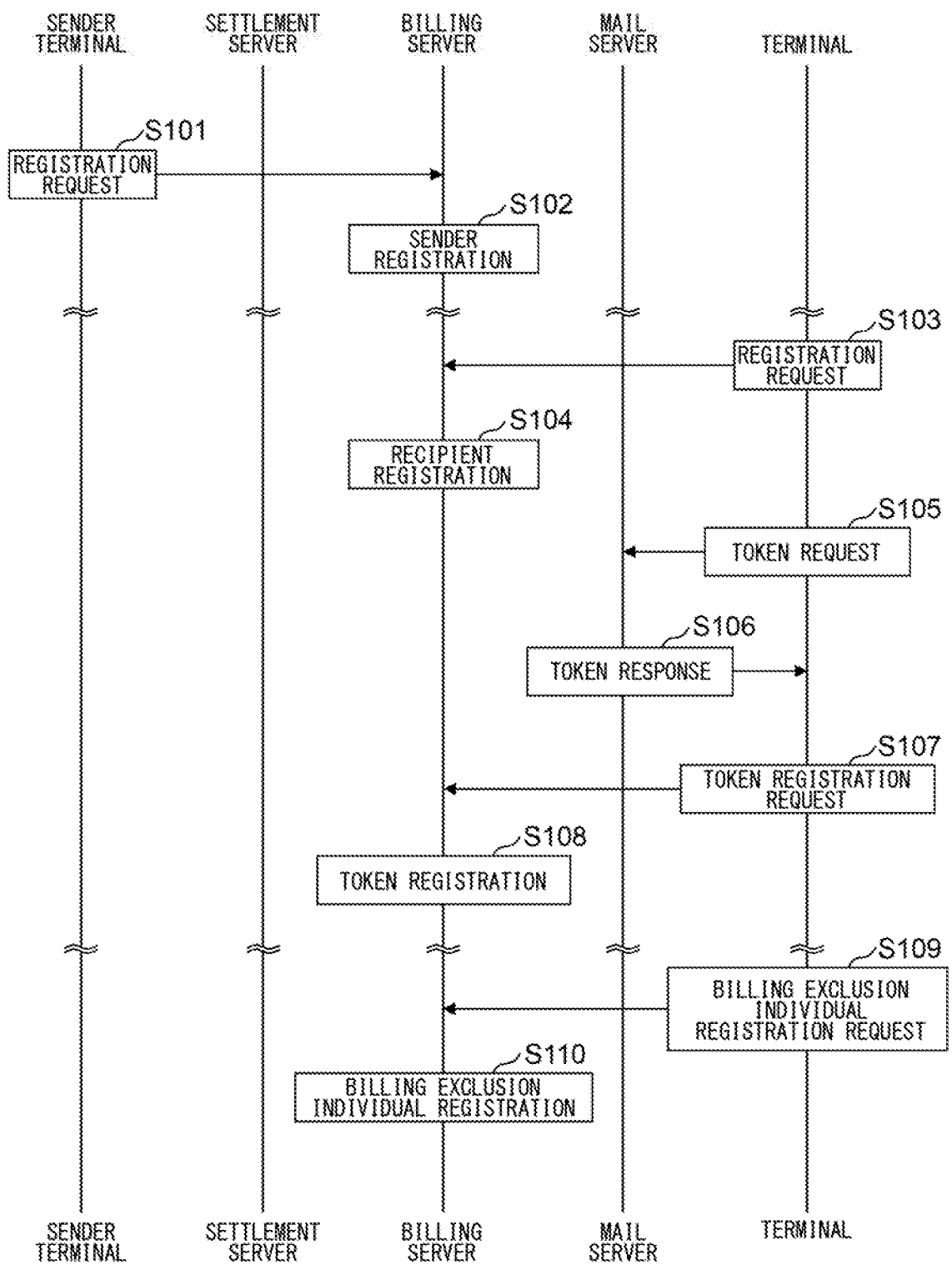
FIG. 10 is a view showing an example of an initial registration operation sequence carried out by the billing system 1.

FIG. 10 is a view showing an example of the initial registration operation sequence carried out by the billing system 1.

The operation sequence described below is executed mainly by the processing unit of each device in cooperation with each element of each device based on a program stored in the storage unit of each device in advance.

Hereinafter, unless explicitly stated otherwise, the sender (user A) of the email uses the sender terminal 2, and the email to be processed by the sender terminal 2 relates to the sender (user A) of the email. Furthermore, the recipient (user B) of the email uses the terminal 7, and the email to be processed by terminal 7 relates to the recipient (user B) of the email.

Initially, the sender registration sequence will be described. The sender terminal 2 transmits a user A registration request to the billing server 4 in accordance with the instruction of the user A (S101). The registration request is transmitted to the billing server 4 by means of a message including information indication registration as a sender, the email address of user A, and first and last names.

Next, the initial registration unit 451 of the billing server 4 receives the registration request transmitted from the sender terminal 2 via the communication unit 41. The initial registration unit 451 detects that the information of the email indicating registration as a sender is included in the registration request, and registers other information included in the registration request in the sender table of the storage unit 44 (S102). As a result, the sender registration sequence ends. The billing server 4 can store information on a plurality of senders in the sender table.

Next, the sequence of recipient registration will be described. The registration request unit 751 of the terminal 7 transmits, in accordance with the instruction of user B, the user B registration request to the billing server 4 via the R communication unit 71 (S103). The registration request is transmitted to the billing server 4 by means of a message including information representing registration as a recipient, the email address and first and last name of user B, the mail server used by user B, a trigger starting settlement, and the SNS name and SNS account used by user B. Note that regarding the mail server used by user B, it is preferable that the billing server 4 present to the terminal 7 mail servers which can be linked with the billing server 4 and the terminal 7 select therefrom.

The initial registration unit 451 of the billing server 4 receives the registration request transmitted from the terminal 7 via the communication unit 41. The initial registration unit 451 detects that the information representing registration as an email recipient is included in the registration request, and registers other information contained in the registration request in the recipient table of the storage unit 44 (S104).

The registration request unit 751 of the terminal 7 transmits a token request to the mail server 6 via the R communication unit 71 (S105). The token request is transmitted to the mail server 6 by means of a message including a user name and password.

The token issuance unit 651 of the mail server 6 receives the token request transmitted form the terminal 7 via the M communication unit 61. The token issuance unit 651 confirms whether the user name and password contained in the token request match the user name and password stored in the M storage unit 64 of the mail server 6 in advance. When they match, the token issuance unit 651 issues an access token and transmits a token response containing the access token to the terminal 7 via the M communication unit 61 (S106). Furthermore, the token issuance unit 651 stores the user name and access token in association with each other in the M storage unit 64. When they do not match, the token issuance unit 651 does not issue an access token and transmits a token response which does not contain an access token to the terminal 7 via the M communication unit 61.

The registration request unit 751 of the terminal 7 receives the token response transmitted by the mail server 6 via the R communication unit 71. When an access token is contained in the token response, the registration request unit 751 transmits the token registration request via the R communication unit 71 (S107). The token registration request is transmitted to the billing server 4 by means of a message containing the email address of the user B and the access token contained in the token response.

The initial registration unit 451 of the billing server 4 receives the token registration request transmitted from the terminal 7 via the communication unit 41. The initial registration unit 451 confirms whether the email address of the user B contained in the token registration request matches with any of the recipient addresses of the entries contained in the recipient table. When they match, the initial registration unit 451 registers the access token in the entry of the recipient table (S108), and when they do not match, the initial registration unit 451 does not perform registration of the access token. In accordance with the foregoing, the recipient registration sequence ends. The billing server 4 can store a plurality of types of recipient information in the recipient table.

In the following processes, the requests transmitted by the billing server 4 to the mail server 6 contain an access token of an email recipient such as user B. The mail server 6, which has received a request message containing an access token, associates this request with the access token and processes as a request from to the user of the user name stored in the M storage unit 64. As a result, the billing server 4 can receive from the mail server 6 the same service as the recipient of the email associated with the access token.

Next, the sequence for registration to the billing exclusion table will be described. The billing exclusion request unit 756 of the terminal 7 transmits a registration request for senders (billing exclusion individuals) who have not requested compensation from the billing server 4 via the R communication unit 71 based on the request by the email recipient (user B) (S109). The registration request is transmitted to the billing server 4 by means of a message containing information indication billing exclusion, the email address (sender address) of the billing exclusion individual, and the email address (recipient address) of user B.

The billing exclusion individuals registration unit 459 of the billing server 4 receives the registration request transmitted from the terminal 7 via the communication unit 41. The billing exclusion individuals registration unit 459 detects that information indicating billing exclusion is contained in the registration request, and registers other information contained in the registration request in the billing exclusion table of the storage unit 44 (S110). As a result, the billing exclusion individuals registration unit 459 registers the sender and recipient of the email as a pair in the billing exclusion table. In accordance with the foregoing, the sequence for registration to the billing exclusion table ends. The billing server 4 can store a plurality of types of sender-recipient pairs in the billing exclusion table.

It should be noted that in the sequence shown in FIG. 10, the order of the sender registration request (S101, S012), the recipient registration request (S103 to S108), and the request for registration to the billing exclusion table (S109, S110) are not limited to this order. For example, the recipient registration request may be executed before the sender registration request. Furthermore, by transmitting the token request (S105) and token response (S106) prior to the registration request (S103), the registration request (S103) may contain the access token transmitted by the token response (S106). As a result, transmission of the token registration request (S107) can be omitted.

Furthermore, though the request for registration to the billing exclusion table has been described as a part of initial registration, the request for registration to the billing exclusion table is not limited to this time. For example, in the case in which user B reads an email and subsequently wishes to execute an email exchange with the sender of the email at no extra cost, user B may execute the request for registration to the billing exclusion table at that time.

<2. Process when Email Arrives at Mail Server 6>

FIG. 1 is a view showing an example of the operation sequence of the process when an email arrives at the mail server 6.

Initially, the sender terminal 2 transmits an email from user A to user B (S201). The mail processing unit 652 of the mail server 6 receives the email transmitted from the sender terminal 2 via the M communication unit 61, and stores the received email in a user B mailbox in the M storage unit 64 (S202).

In parallel with the processes of S201 and S202, the sender acquisition unit 452 of the billing server 4 detects whether the recipient mail server (mail server 6) has received any new mail addressed to a mail recipient stored in the recipient table (S203). For example, the sender acquisition unit 452 acquires from the mail server 6 and stores the headers of the emails stored in the user B mailbox at predetermined cycles. If the acquired header includes a header that has not been acquired in the previous cycle, the sender acquisition unit 452 judges that the mail server 6 has received a new mail. When new mails are not received by the mail server 6 the sender acquisition unit 452 does not execute the processes of S204 and thereafter, which are described later, and again performs the judgment of S203 after the predetermined cycle has elapsed.

When the mail server 6 has received a new mail, the sender acquisition unit 452 acquires the sender and recipient thereof from the new mail. For example, the sender acquisition unit 452 extracts the email address described in the "From:" field as the sender email address and the email address described in the "To:" field as the recipient email address from the header of a previous acquired email, from the acquired header of the email.

Next, the sender acquisition unit 452 judges whether an entry matching the acquired sender and recipient email address pair is present in the billing exclusion table stored in the storage unit 44 (S204). In other words, the sender acquisition unit 452 judges whether or not to request compensation from the email sender (whether or not a matching entry is present).

When compensation is requested (a matching entry is not present)(S204—Y), in order to request compensation for the user B to perform the predetermined operation on the email from the email sender (user A), the compensation determination unit 453 of the billing server 4 determines the compensation (S205). The details of the process of S205 will be described later.

When the compensation determination unit 453 determines compensation, the information requisition unit 454 transmits the request for compensation from the email sender (user A) to the settlement server 5 via the communication unit 41 (S206). The request for compensation is transmitted to the settlement server 5 by means of a message containing the MID, the first and last names of the email sender, and the compensation amount determined in S205. Regarding the first and last names of the email sender, the sender email address acquired by the sender acquisition unit 452 is used as a key, and the first and last names extracted by the information requisition unit 454 from the sender table are used.

Based on the request from the billing server 4, the settlement server 5 transmits the request for compensation for the email recipient (user B) to perform the operation on the email to the sender terminal 2 (user A)(S207). The sender terminal 2 receives the request from the settlement server 5 and transmits a compensation response containing whether or not compensation is to be paid and additionally a credit card number when compensation is to be paid to the settlement server 5 in accordance with the instructions from user A (S208).

When a response is received from the sender terminal 2, and the received response is a reply indicating that the payment of the compensation is to be performed, the settlement server 5 stores the settlement information containing the MID transmitted in S207, the first and last names of the email sender, the compensation amount, and the credit card number contained in the response (S209). When the first and last names used by the sender terminal 2 for settlement are contained in the response, the settlement server 5 may store the first and last names transmitted in the response instead of the first and last names of the email sender transmitted in S207. The settlement server 5 further transmits a compensation response indicating whether or not the payment of the compensation is to be performed to the billing server 4, based on the received response (S210). It should be noted that at this time, the settlement server 5 does not transmit the credit card number to the billing server 4. The results reception unit 455 of the billing server 4 receives the response to the compensation request transmitted in S206 from the settlement server 5 via the communication unit 41. In accordance with the foregoing, the process in the case in which compensation is requested from the email sender (when a matching entry is not present) ends.

When compensation is not requested (a matching entry is present) (S204—N), the billing server 4 does not execute the processes of S205 to S210. In other words, the information requisition unit 454 excludes emails having the same sender and recipient pair as a pair registered by the billing exclusion individuals registration unit 459 from the target of the request for settlement information.

When the result indicating that the settlement information has been supplied in S210 is transmitted and received by the results reception unit 455 (S211—Y), the display changing unit 456 controls the mail server 6 so as to change the display of the email judged in S204 prior to opening to the predetermined display format (S212). When the sender acquisition unit 452 judges in S204 that compensation has not been requested (S211—Y), the display changing unit 456 controls the mail server 6 so as to change the display of the email judged in S204 to another predetermined display format (S212). The mail processing unit 652 of the mail server 6 sets the display of the email prior to opening to the predetermined display format in accordance with the control of S212 (S213).

For example, the display changing unit 456 uses the API (Application Programming Interface) cooperation function supplied by the mail server 6 to add label information indicating billing exclusion or that settlement information has been supplied to the header of the email stored in the mail server 6. Furthermore, for example, the display changing unit 456 transmits the request for setting the display format of the email in the list of received emails to the predetermined format, to the mail server 6. The mail processing unit 652 of the mail server 6 executes the setting requested by the display changing unit 456 of the billing server 4.

When it is judged in S204 that compensation is to be requested and result indicating that settlement information has not been supplied in S201 is transmitted, the display changing unit 456 does not execute the processes of S212 and S213. In other words, when the received email is a billing target and the supply of settlement information for the email is not received by the settlement server 5, the mail processing unit 652 of the mail server 6 does not set the display of the email prior to opening to the predetermined display format. In accordance with the foregoing, the operation sequence of the process when an email arrives is completed.

Note that the sender terminal 2 and the settlement server 5 may use other settlement information used by bank net settlement, mobile carrier settlement, etc., in place of a credit card number. Furthermore, though the billing server 4 requests, via the settlement server 5, that user A input information necessary for the settlement of the compensation to the settlement server 5, the billing server 4 may make such a request directly to user A. For example, the information requisition unit 454 of the billing server 4 transmits a request for compensation for user B to perform the operation on the email to the sender terminal 2 (user A) via the communication unit 41. The information requisition unit 454 describes in the request a URL for inputting settlement information such as a credit card number to the settlement server 5, and user A may input settlement information to the settlement server 5 from the webpage represented by the URL.

Since the billing system 1 changes the display of emails prior to opening for which the settlement information has been supplied to a predetermined display format in this manner, the email recipient can treat emails for which settlement information has been supplied separately from emails for which settlement information has not been supplied. For example, the email recipient can open and process emails for which settlement information has been supplied at a higher priority than emails for which settlement information has not been supplied.

Furthermore, the information for registration to the billing exclusion table is a set of a sender address and a recipient address. Thus, the billing server 4 can exclude emails transmitted from user B to user A from billing even if the emails transmitted from user A to user B are identified as billing targets in the judgement of S204.

Figure 11:
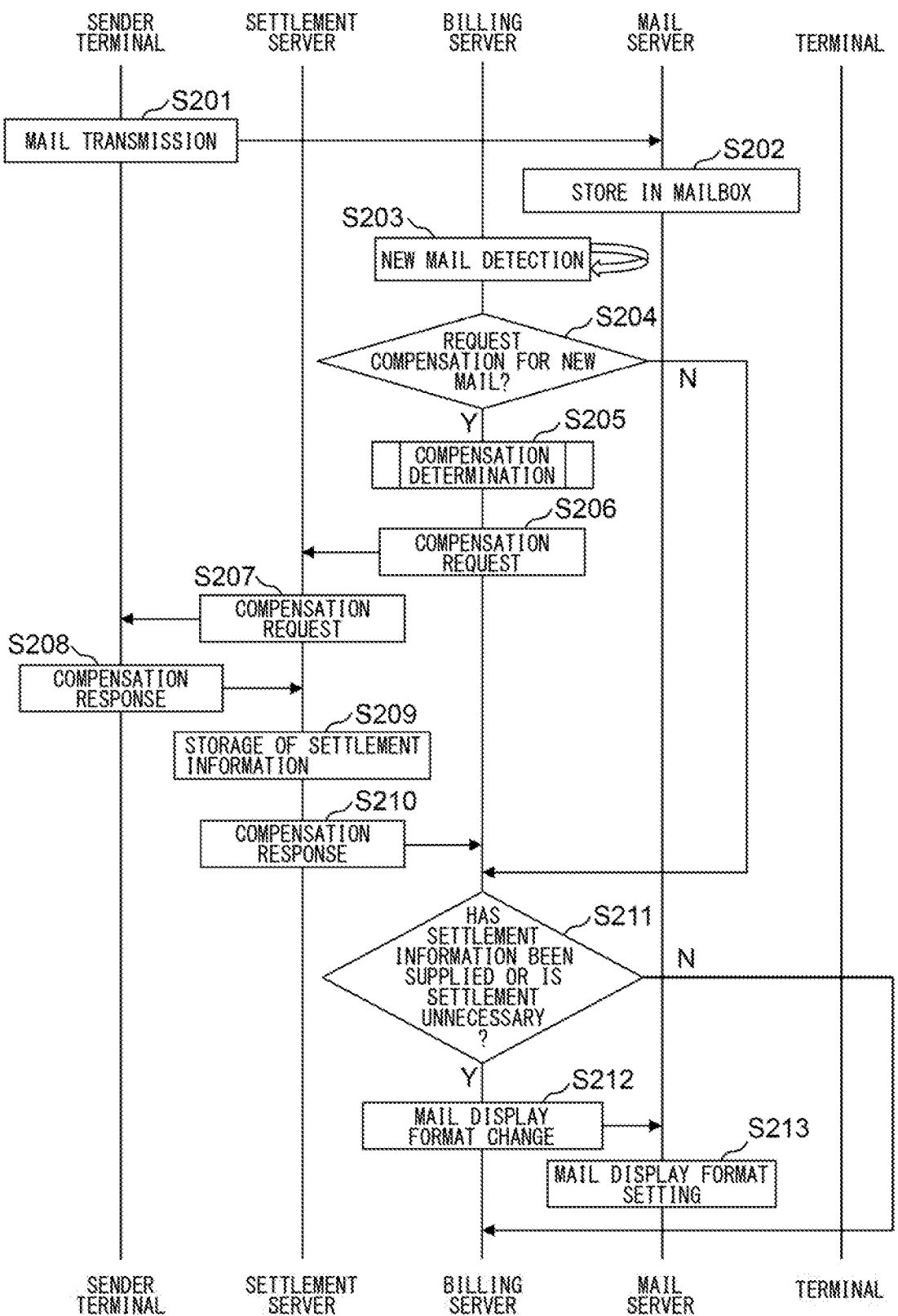
FIG. 11 is a view showing an example of a processing operation sequence when an email arrives at the mail server 6.
Figure 12:
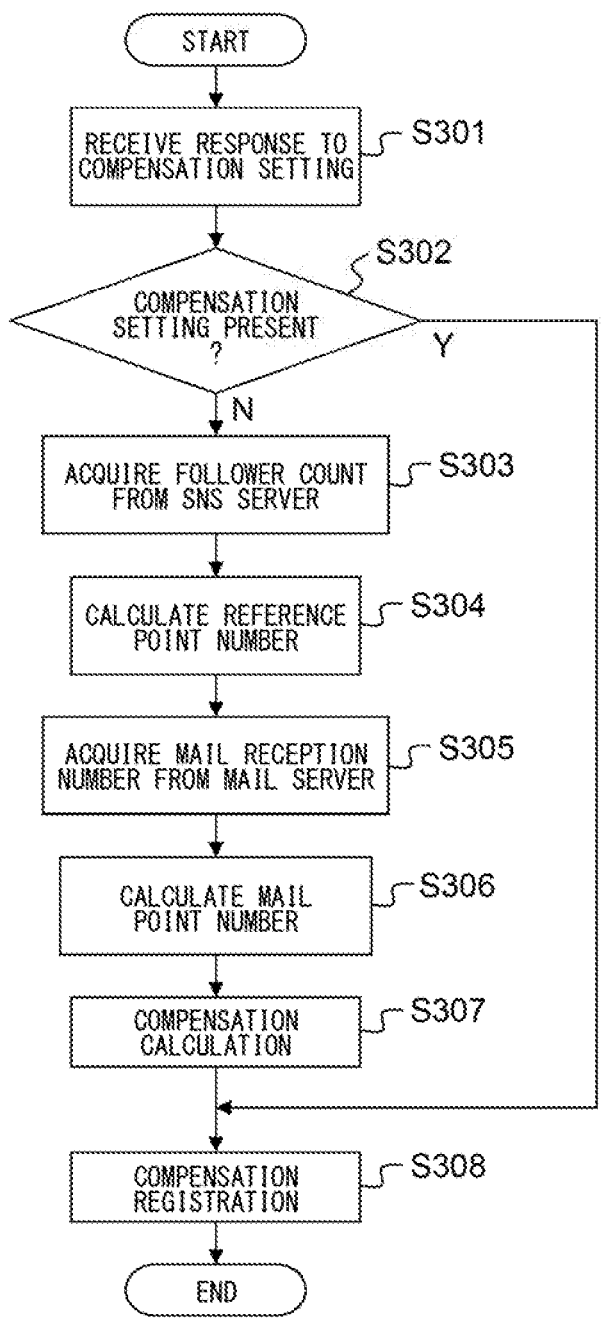
FIG. 12 is a flowchart illustrating an example of compensation determination processing by the billing server 4.

FIG. 12 is a flowchart showing an example of the compensation determination process by the billing server 4, and FIG. 13 is a view showing an example of the compensation determination method by the billing server 4. The process of the flowchart of FIG. 12 corresponds to the process of S205 of FIG. 11, and is executed when the sender acquisition unit 452 judges that compensation should be requested in S204.

Note that the operation described below are executed by the processing unit 45, which primarily comprises a CPU, in cooperation with each element of the billing server 4 based on a program stored in the storage unit 44 in advance.

The compensation determination unit 453 of the billing server 4 transmits a compensation setting request, which is requested of the email sender (user A), to the terminal 7 (user B) via the communication unit 41, and receives a response thereto from the terminal 7 (S301). The compensation amount is preferably specified in 100 yen increments up to a maximum of 2000 yen.

Next, the compensation determination unit 453 judges whether compensation is indicated in the received response (S302).

When compensation is not indicated in the response (S302—N), the compensation determination unit 453 acquires the SNS name and SNS account used by the email recipient (user B) from the recipient table. Next, the compensation determination unit 453 transmits a request for the follow count of the account indicated by the SNS account to the SNS server represented by the SNS name via the communication unit 41. Next, the compensation determination unit 453 receives the follower count of user B from the SNS server via the communication unit 41 (S303). These processes may be executed using the API cooperation function supplied by the SNS server.

The compensation determination unit 453, which has received the follower count of user B, calculates a reference point number based on the follower count (S304). For example, when the settlement trigger is "opening", it is preferable that the calculation formula "reference point number=follower count×0.03 (rounded to the nearest decimal point)" be used. Note that when the follower count exceeds 1000000 followers, calculation is performed using a follower count of 1000000. An example of the calculation of the reference point number by this method is shown in FIG. 13(a).

Since it is more preferably for the email sender (user A) to receive a reply than simply opening (with the expectation of reading), when the settlement trigger is "reply", the compensation determination unit 453 may use a calculation formula in which the reference point number is higher than the case of "opening." For example, it is preferable that the calculation formula "reference point number=follower count×0.05 (rounded to the nearest decimal point)" be used.

Next, the compensation determination unit 453 acquires the mail server (mail server 6) used by the email recipient (user B) from the recipient table and transmits a request for an email reception number for the last 30 days. In other words, the compensation determination unit 453 issues a request to the mail server associated with the email recipient in the recipient table to transmit the email reception number of the recipient in the last 30 days. Next, the compensation determination unit 453 receives the email reception number from the mail server 6 via the communication unit 41 (S305). These processes may be executed using the API cooperation function supplied by the mail server 6.

Next, the compensation determination unit 453 calculates a mail point number based on the email reception number (S306). For example, when the settlement trigger is "opening" it is preferable that the calculation formula shown in FIG. 13(*b*) be used. Note that when the reception number exceeds 100, calculation is performed using a mail reception number of 100.

As shown in FIG. 13(*b*), the calculation of the mail point number is weighted by a predetermined coefficient (1.1) by performing an exponential calculation based on the mail reception number. This is based on the idea that email recipients have difficulty reading every email as the number of emails received increases, and thus, the sender must provide the recipient greater compensation in order to receive preference.

By the same idea as calculation of the reference point number based on the follower count, the compensation determination unit 453 may use a calculation formula in which the mail point number is greater when the settlement trigger is "reply" than when it is "opening." For example, in the formula of FIG. 13(*b*), the coefficient 1.3, which is changed from 1.1, may be used.

Next, the compensation determination unit 453 calculates the compensation based on the reference point number and the mail point number (S307). For example, the compensation determination unit 453 may calculate the compensation by the calculation formula "compensation (yen)=(reference point number+mail point number)×10."

Next, the compensation determination unit 453 registers an entry including the MID of the email for which it is judged in S204 of FIG. 11 that compensation for the user B to perform the predetermined operation is to be requested, the sender address, the recipient address, and the compensation in the message table (S308). At this time, the compensation determination unit 453 registers the received value in the compensation column in the case in which compensation is received in S301, and registers the value calculated in S307 when the compensation is not received in S301. Furthermore, the compensation determination unit 453 sets the attribute value of the billing process status column of the entry to "not requested" and the attribute value of the mail process status column to "not opened." In accordance with the foregoing, the compensation determination process ends.

<3. Process at the Time of Email Operation by Terminal 7>

Figure 14:
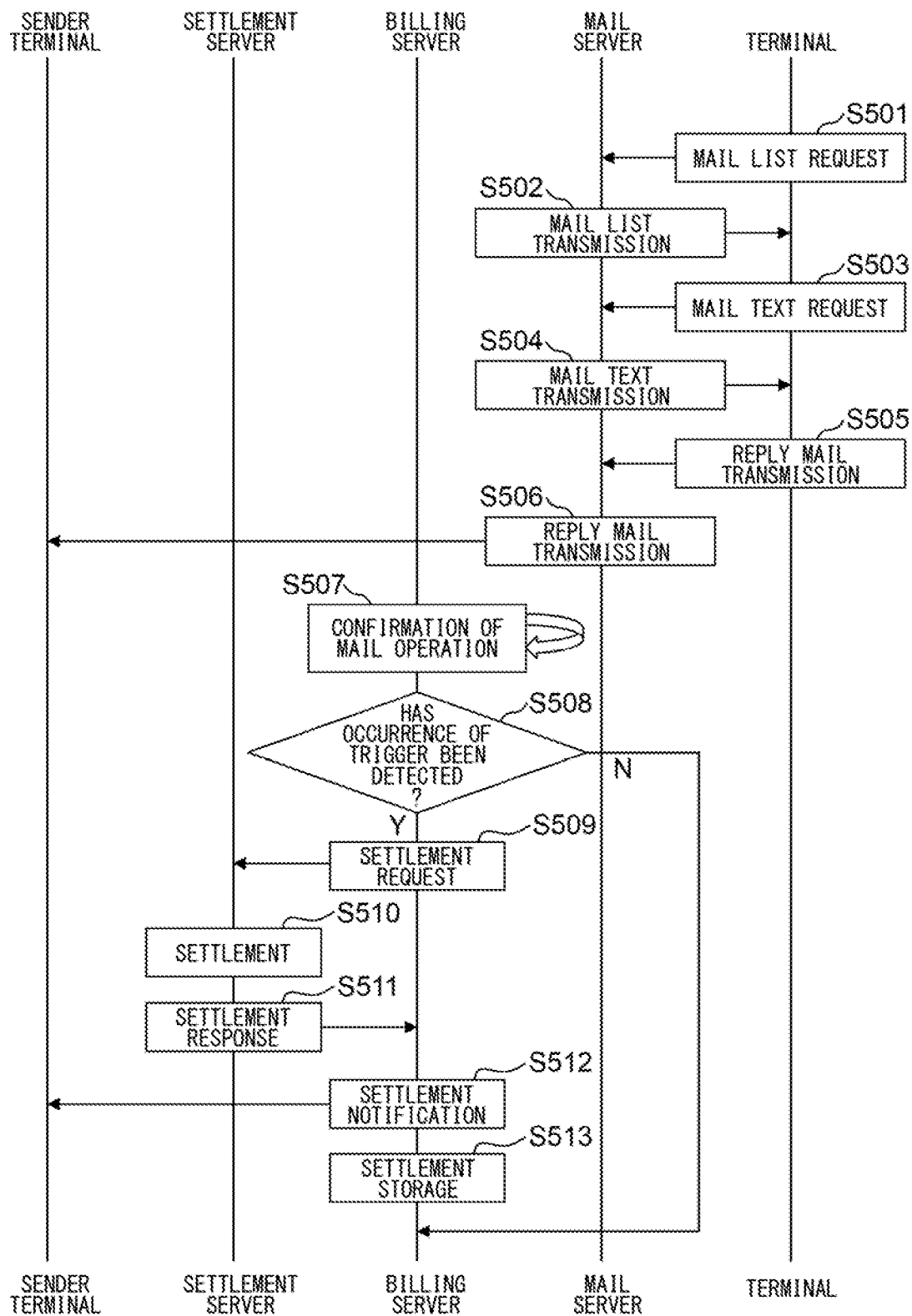
FIG. 14 is a view showing an example of a processing operation sequence after email acquisition by the billing system 1.

FIG. 14 is a view showing an example of the operation sequence of the process by the billing system 1 after an email is acquired, and FIG. 15 is a view showing an example of an email list screen displayed on the terminal 7.

The mail reception unit 752 of the terminal 7 requests that the mail server 6 supply a list of received emails via the R communication unit 71 (S501). The mail processing unit 652 of the mail server 6 receives the request from the terminal 7 via the M communication unit 61, and transmits the list of emails sent to user B to the terminal 7 (S502). Though the email list includes the email sender names and subjects extracted from the header information of the emails, etc., information on the texts of the emails is not included. When the mail display unit 753 of the terminal 7 receives the email list from the mail server 6 via the R communication unit 71, the R display unit 73 displays the contents thereof. An example of this display is shown in FIG. 15.

FIG. 15 shows an example of an email from the sender "TOHSHI KIBOU" having the subject "New Business Model Suggestions" for which settlement information has been supplied (displayed with a * (star) mark) and an email from the sender "KIM SHOU" having the subject "Investment Request" for which settlement information has not been supplied. This display is displayed by the mail display unit 753 of the terminal 7 based on the addition of the label information to the email or the setting of the display format of the email to the predetermined format, which is executed by the mail server 6 in step S213 of FIG. 11.

In accordance with the instructions of user B using the R operation unit 72, the mail reception unit 752 of the terminal 7 transmits an acquisition request for the text of the email indicated by the user B via the R communication unit 71 to the mail server 6 (S503). The mail processing unit 652 of the mail server 6 receives the request from the terminal 7 via the M communication unit 61, and transmits the full text of the email addressed to user B to the terminal 7 (S504). Furthermore, the mail processing unit 652 stores the fact that the email for which the full text has been transmitted to the terminal 7 has been "opened" in the M storage unit 64. The mail reception unit 752 of the terminal 7 receives the full text of the email from the mail server 6 via the R communication unit 71, and the mail display unit 753 displays the full text of the email received by the mail reception unit 752 on the R display unit 73.

In accordance with the instructions of user B using the R operation unit 72, the mail creation unit 754 creates a replay to the email displayed by the mail display unit 753. The mail transmission unit 755 transmits a request to transmit the email (replay) generated by the mail creation unit 754 to user A to the mail server 6 via the R communication unit 71 (S505). The mail processing unit 652 of the mail server 6 receives the request from the terminal 7 via the M communication unit 61, and transmits the email addressed to user A to the sender terminal 2 (S506). The mail processing unit 652 stores the fact that the email for which the full text has been transmitted to the terminal 7 has been "replied" to in the M storage unit 64.

In parallel with the processes of S501 to S506, the operation detection unit 458 of the billing server 4 periodically confirms the operation executed by user B on the emails in the mailbox of the mail server 6 (S507). The operations detected by the operation detection unit 458 includes the opening of emails and operation executed on the email after opening.

For example, the operation detection unit 458 transmits a mail process status request related to emails stored in the message table for which user B is the recipient to the mail server 6 via the communication unit 41. When the operation detection unit 458 receives a mail process status response form the mail server 6, comparison with the mail process status stored in the message table is performed.

When the mail process status received from the mail server 6 and the mail process status stored in the message table differ for a certain email, the operation detection unit 458 updates the attribute value in the mail process status column of the message table to the mail process status received from the mail server 6. For example, if the attribute value in the mail process status column of the message table is "unopened" and the mail process status received from the mail server 6 is "opened" for a certain email, the attribute value in the mail process status column of the message table for the email is updated to "opened."

Next, the operation detection unit 458 confirms whether the mail process status of each email received from the mail server 6 matches a settlement trigger for user B (S508). In other words, the operation detection unit 458 confirms whether the attribute value of each email in the mail progress status column of the message table matches with an attribute value in the settlement trigger column associated with the recipient address of the email in the recipient table. When they match, the operation detection unit 458 judges that a settlement trigger has occurred, and when they do not match, the operation detection unit 458 judges that a settlement trigger has not occurred.

When the operation detection unit 458 detects the occurrence of a settlement trigger (S508—Y), the settlement requisition unit 457 transmits a settlement request containing the MID of the email for which the occurrence of a settlement trigger has been detected to the settlement server 5 via the communication unit 41 (S509). In other words, when the results reception unit 455 has supplied settlement information, and the operation detection unit 458 detects that the predetermined operation has been executed, the settlement requisition unit 457 requests that the settlement server 5 execute settlement. The settlement server 5, which has received the settlement request, executes settlement for user A based on the settlement information stored in S209 of FIG. 11 and the received MID (S510), and transmits a response indicating the execution of settlement to the billing server 4 (S511). In the settlement in S510, the settlement server 5 pays the user B an amount obtained by subtracting a system fee for processing by the billing server 4.

When a response is received from the settlement server 5 via the communication unit 41, the settlement requisition unit 457 of the billing server 4 generates a notification containing information representing that a settlement trigger has occurred and that settlement has been executed or settlement was attempted but could not be executed. The settlement requisition unit 457 transmits the generated notification via the communication unit 41 (S512), and changes and saves the billing process status in the message table as "paid" if settlement was successful and "unpaid" if unsuccessful (S513). The settlement requisition unit 457 may again execute the process of S509 and thereafter for emails for which the billing process status in the message table is "unpaid."

When the operation detection unit 458 cannot confirm the occurrence of a settlement trigger (S508—N), the processes of S509 to S513 are not executed. In accordance with the foregoing, the operation sequence of the process after an email is acquired ends.

It should be noted that though the settlement requisition unit 457 transmits a settlement request to the settlement server 5 when the operation detection unit 458 detects the occurrence of a settlement trigger (S509), the settlement requisition unit 457 may reference the billing exclusion table prior to transmitting the settlement request. For example, when the sender/recipient pair of the settlement request target email is present in an entry in the billing exclusion table, the settlement requisition unit 457 does not transmit a settlement request to the settlement server 5. As a result, when the sender/recipient pair of the email for which it has been determined that the payment of compensation is to be made in S208 of FIG. 11 is later registered in the billing exclusion table (when the recipient determined that billing should not be requested from the sender), the billing server 4 can prevent the billing of the sender of the email.

Furthermore, though the operation detection unit 458 receives the mail process status from the mail server 6, the mail process status may be detected by the mail server 6 or the operation contents of the terminal 7 may be notified via the mail server 6. In either case, the operation detection unit 458 detects the operation executed on the email by the terminal 7 via the mail server 6.

As described above, the billing server according to the present invention changes the display prior to opening of the email when the settlement information of the compensation for performing the operation on the email is input to the settlement server, and executes settlement when the email is opened or when the operation is executed after the email has been opened. Thus, the email recipient can receive an email at the same address, regardless of whether or not the email is a billing target, and can treat such emails separately.

Furthermore, the information requisition unit 454 of the billing server 4 can exclude as a target for request of information necessary for the settlement of the compensation emails having a sender and recipient pair identical to a pair registered by the billing exclusion individuals registration unit 459. Thus, the billing server 4 can eliminate the waste of charging compensation every time to a person for whom it has been determined that emails can be continuously exchanged without additional compensation.

Furthermore, the compensation determination unit 453 of the billing server 4 calculates the compensation based on the SNS follower count of the email recipient. Thus, the billing server 4 can determine the compensation amount based on objective indicators rather than the subjectivity of the email recipient.

It should be noted that the present invention is not limited to the present embodiment. For example, in the present embodiment, the mail server 6 supplies the service to the terminal 7 using HTTP. Instead, the mail server 6 may use a communication protocol such as SMTP (Simple Mail Transfer Protocol), POP3 (Post Office Protocol version 3), or IMPA (Internet Message Access Protocol) to send and receive emails to and from the terminal 7.

Furthermore, though "opening" and "replying" have been exemplified as settlement triggers in the present embodiment, the settlement triggers are not limited thereto, and operations such as, for example, the sending of emails to a specific individual or saving to a predetermined folder may be adopted as settlement triggers. By setting an action that cannot be executed without opening the email as a settlement trigger, it can be guaranteed at the time of settlement at least that the email has been opened.

Furthermore, though conventional currency has been exemplified as the compensation in the present embodiment, the compensation is not limited thereto, and, for example, points earned by using specific services, virtual currency, and electronic money may be adopted.

Furthermore, the use of the mail server 6 by the sender terminal 2 for sending and receiving emails has been exemplified in the present embodiment, the sender terminal 2 may be connected to another mail server, and the sending and reception of emails with the terminal 7 using the mail server 6 may be executed via the other mail server.

First Modified Example

When a reply mail has not been transmitted by the recipient of an email, for which "opening" has been set as the attribute value of the settlement trigger, regardless of the fact that the email has been opened, the billing server 104 according to the first modified example transmits a follow-up email which prompts a reply to the email to the recipient.

Figure 16:
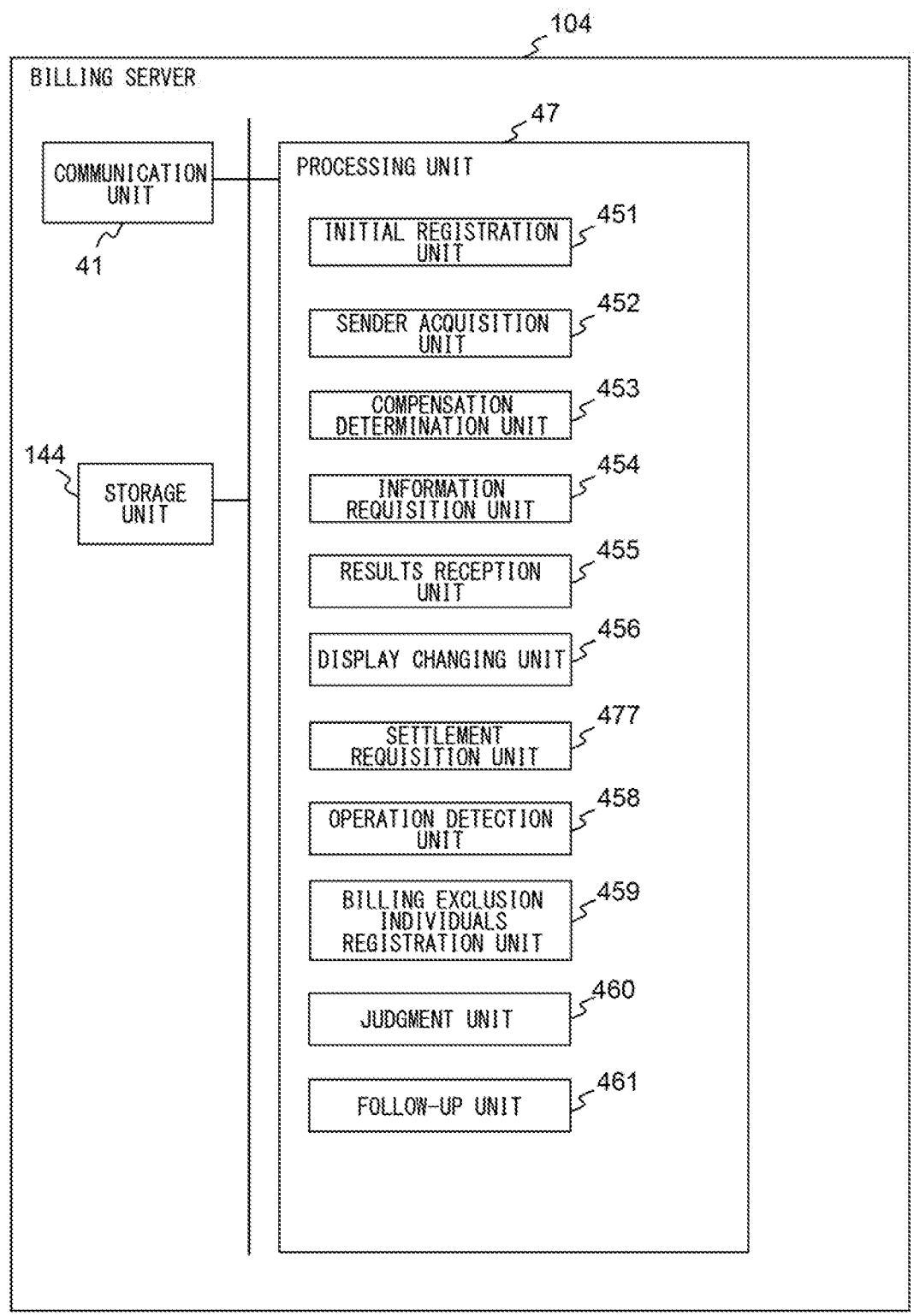
FIG. 16 is a view showing an example of the schematic structure of a billing server 104 according to a first modification.

FIG. 16 is a view showing an example of the schematic structure of the billing server 104 according to the first modified example.

The billing server 104 differs from the billing server 4 in that a follow-up frequency table is further included in the storage unit 144, a judgment unit 460 and a follow-up unit 461 are further included in the processing unit 47, and that a part of the contents of the process of the settlement requisition unit 477 differs. The structures and functions of the constituent elements of the billing server 104 other than the follow-up frequency table, the settlement requisition unit 477, the judgment unit 460, and the follow-up unit 461 are identical to the structures and functions of the constituent elements of the billing server 4 assigned the same reference sign, and thus, detailed descriptions thereof have been omitted herein.

FIG. 17 is a view showing an example of the follow-up frequency table according to the first modified example.

As shown in FIG. 17, the SNS follower count, a follow-up mail frequency, and a follow-up mail interval are stored in association with each other in the follow-up frequency table. The SNS follower count is the SNS follower count of the recipient of the emails for which the occurrence of a settlement trigger has been detected. Hereinafter, the email for which the occurrence of a settlement trigger has been detected will be referred to as a "target email."

A follow-up mail is an email which prompts a reply to the target email. A follow-up mail is transmitted to the recipient when a replay mail has not been transmitted from the recipient of the target mail regardless of the fact that settlement has been executed. The follow-up mail frequency is the frequency at which follow-up mails are transmitted for a single target email. The follow-up mail interval represents the interval from the time when the opening of the target email is detected to the time an initial follow-up mail is transmitted. When the follow-up frequency is two repetitions or more, the follow-up mail interval may also represent the interval from the time at which a certain follow-up email has been transmitted to the time when the next follow-up mail is transmitted.

The initial registration operation sequence and the operation sequence of the process when an email arrives according to the first modified example are identical to the initial registration operation sequence and the operation sequence of the process when an email arrives in the embodiment, and thus, a detailed description thereof has been omitted herein.

Figure 18:
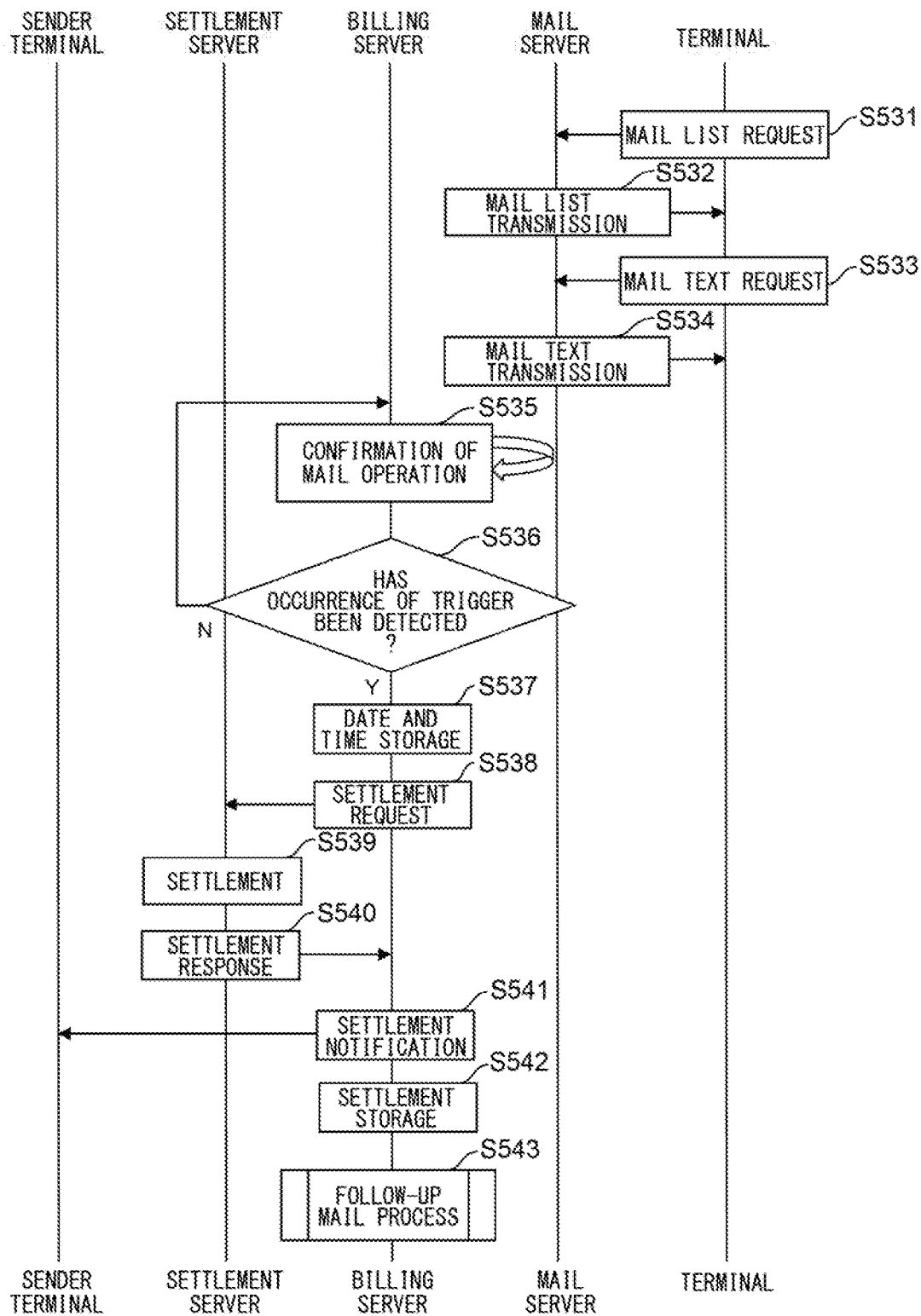
FIG. 18 is a view showing an example of a processing operation sequence after email acquisition according to the first modification.

FIG. 18 is a view showing an example of the operation sequence of the process after an email has been acquired according to the first modified example.

The processes of S531 to S535, excluding execution by the settlement requisition unit 477 in place of the settlement requisition unit 457, are identical to the process of S501 to S504 and S507 of the process after an email has been acquired according to the embodiment, and thus, a detailed description thereof has been omitted herein.

The operation detection unit 458 confirms whether or not the attribute value of the mail process status column of each email in the message table matches the attribute value of the settlement trigger column associated with the recipient address of the email in the recipient table (S536).

When the two attribute values do not match in the process of S536 (S536—N), the process proceeds to S535. In other words, when the operation detection unit 458 cannot confirm the occurrence of a settlement trigger, the processes of S535 and S536 are repeated.

When the operation detection unit 458 detects the occurrence of a settlement trigger in the process of S536 (S536—Y), the settlement requisition unit 477 associates the MID of the email for which the occurrence of a settlement trigger was detected and the current date and time with each other and stores them in the storage unit 144 (S537).

The processes of S538 to S542, excluding the execution by the settlement requisition unit 477 in place of the settlement requisition unit 457, are identical to the processes of S509 to S513 of the process after an email has been acquired according to the embodiment, and thus, a detailed description thereof has been omitted herein.

Next, the judgment unit 460 and the follow-up unit 461 execute a follow-up mail process (S543). In accordance with the foregoing, the operation sequence of the process afer an email has been acquired ends.

Figure 19:
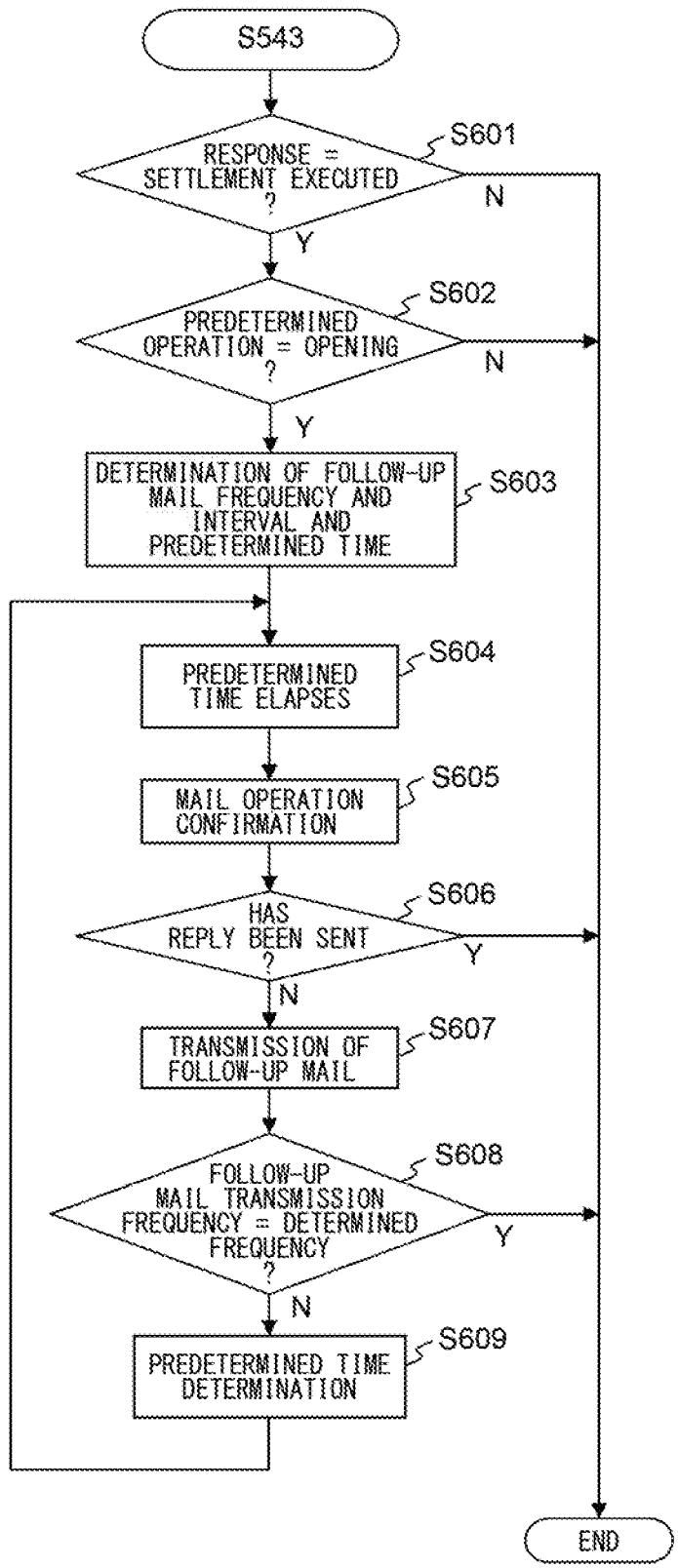
FIG. 19 is a flowchart illustrating an example of follow-up mail processing according to the first modification.

FIG. 19 is a flowchart showing an example of the follow-up mail process according to the first modified example.

The process of the flowchart of corresponds to the process of S543 of FIG. 18 and is executed for each target email.

It should be noted that the operations described below are executed by the processing unit 47 mainly comprising a CPU in cooperation with each of the elements of the billing server 4 based on a program stored in the storage unit 144 in advance.

Initially, the judgment unit 460 judges whether the settlement response received by the settlement requisition unit 477 indicates that settlement has been executed (S601). When the settlement response does not indicate that settlement has been executed (S601—N), the follow-up mail process ends.

When the settlement response indicates that settlement has been executed (S601—Y), the judgment unit 460 judges whether the settlement trigger corresponding to the settlement response, i.e., the predetermined operation, is opening of the email (S602). When the predetermined operation is not opening of the email (S602—N), the follow-up mail process ends.

When the predetermined operation is opening of the email (S602—Y), the follow-up unit 461 determines the frequency and interval at which follow-up mails are transmitted based on the SNS follower count of the recipient of the target email (S603). The follow-up unit 461 receives the SNS follower count of the recipient of the target email by a method identical to the method by which the compensation determination unit 453 receives the SNS follower count in the process of S303. The follow-up unit 461 determines the follow-up mail transmission frequency and transmission interval based on the received SNS follower count and the information registered in the follow-up frequency table.

In the follow-up frequency table shown in FIG. 17, the frequency of follow-up mails is set higher the higher the SNS follower count of the email sender. Individuals with high SNS follower counts are generally busy, and replies to email tend to be delayed. Thus, the follow-up unit 461 preferably increases the chance of recognition of lack of reply to the email by determining that the follow-up mail frequency should be increased as the SNS follower count of the sender of the email increases.

Furthermore, in the follow-up frequency table shown in FIG. 17, the follow-up mail interval is set longer the higher the SNS follower count of the email sender. Since the follow-up mail frequency is increased the higher the SNS follower count of the email sender in the follow-up frequency table, in some cases, shortening of the follow-up mail interval can increase the frequency of follow-up mails more than is necessary, which can cause inconvenience to the email sender. The follow-up unit 461 preferably performs determination so that the follow-up mail interval becomes long as the number of SNS followers of the email sender increases.

Next, the follow-up unit 461 extracts the date and time associated with the MID identical to the MID of the target email from the date and time at which the occurrence of the settlement trigger stored in the storage unit 144 in the process of S537 was detected. Next, the follow-up unit 461 determines the time at which the presence or absence of a reply to the target email should be confirmed by adding the follow-up mail interval to the extracted date and time. Below, the time at which the presence or absence of a reply to the determined target email should be confirmed will be referred to as the predetermined time.

Next, the judgment unit 460 sets the transmission frequency of the follow-up mail to the initial value of 0, and waits until the predetermined time (S604).

Next, when it is detected that the predetermined time has elapsed, the judgment unit 460 confirms the operation state of the target email in the mail box of the mail server 6 (S605), the judgment unit 460 updates the message table by a method identical to the method by which the operation detection unit 458 updates the mail process status of the message table in the process of S535, and confirms the operation state of the target email.

Next, the judgment unit 460 judges whether the recipient of the target email has transmitted a reply mail to the target email by the predetermined time based on the confirmed operation state of the email (S606). For example, if the mail process status of the target email is "replied" in the message table, it is judged that the recipient of the target email has transmitted a reply mail to the target email by the predetermined time. When the recipient of the target mail has transmitted a reply mail by the predetermined time (S606—Y), the follow-up mail process ends.

When the recipient of the target email has not transmitted a reply mail by the predetermined time (S606—N), the follow-up unit 461 transmits a follow-up mail to the recipient of the target email (S607). The follow-up unit 461 acts as an email client, and transmits a follow-up mail addressed to the recipient of the target email to the mail server 6 via the communication unit 41.

The mail processing unit 652 of the mail server 6 receives the transmitted follow-up mail via the M communication unit 61, and stores the received follow-up mail in the mailbox for the recipient of the target email in the M storage unit 64. The mail reception unit 752 of the terminal 7 acquires the follow-up mail from the mailbox of the mail server 6 via the R communication unit 71, and displays it on the R display unit 73, whereby the recipient of the target email can recognize the follow-up mail.

Next, the follow-up unit 461 stores the date and time at which the follow-up mail was transmitted in the storage unit 144, and increases the transmission frequency of the follow-up mail by 1. Next, the judgment unit 460 determines whether the transmission frequency of the follow-up mail matches the transmission frequency determined in the process of S603 (S608). When the transmission frequency of the follow-up mail matches the transmission frequency determined in the process of S603 (S608—Y), the follow-up mail process ends.

When the transmission frequency of the follow-up mail does not match the transmission frequency determined in the process of S603 (S608—N), the judgment unit 460 determines a new predetermined time from the date and time at which the follow-up mail was transmitted stored in the storage unit 144, and the follow-up mail interval (S609). Next, the process returns to S604, and the processes of S604 to S609 are repeated.

Since the billing server 104 according to the first modified example transmits a follow-up email when the recipient of the target email does not transmit a reply mail to the target email, it is possible to reduce failure of the recipient to transmit the reply mail.

Note that the follow-up mail process of S543 may be executed after the settlement requisition unit 477 has received the settlement response transmitted from the settlement server 5 in the process of S540.

Furthermore, the date and time used as the start point for determining the predetermined time in the process of S603 may be the date and time at which the settlement requisition unit 477 transmits the settlement request in the process of S538 or may be the date and time at which the settlement requisition unit 477 receives the response transmitted in the process of S540.

Furthermore, in the process of S603, the follow-up unit 461 may determine only one of the frequency and interval at which the follow-up mails are transmitted based on the SNS follower count of the recipient, or may use a predetermined value irrespective of the SNS follower count. Furthermore, in the process of S603, the follow-up unit 461 may determine the predetermined time using predetermined transmission frequency and interval in place of the predetermined time determined based on the determined results of the frequency and interval at which the follow-up mails are transmitted.

Second Modified Example

The billing server 204 according to the second modified example is a modified version of the billing server 104 according to the first modified example, and transmits a follow-up mail to the recipient of the email by satisfying other conditions when the sender of the email pays a predetermined cost.

Figure 20:
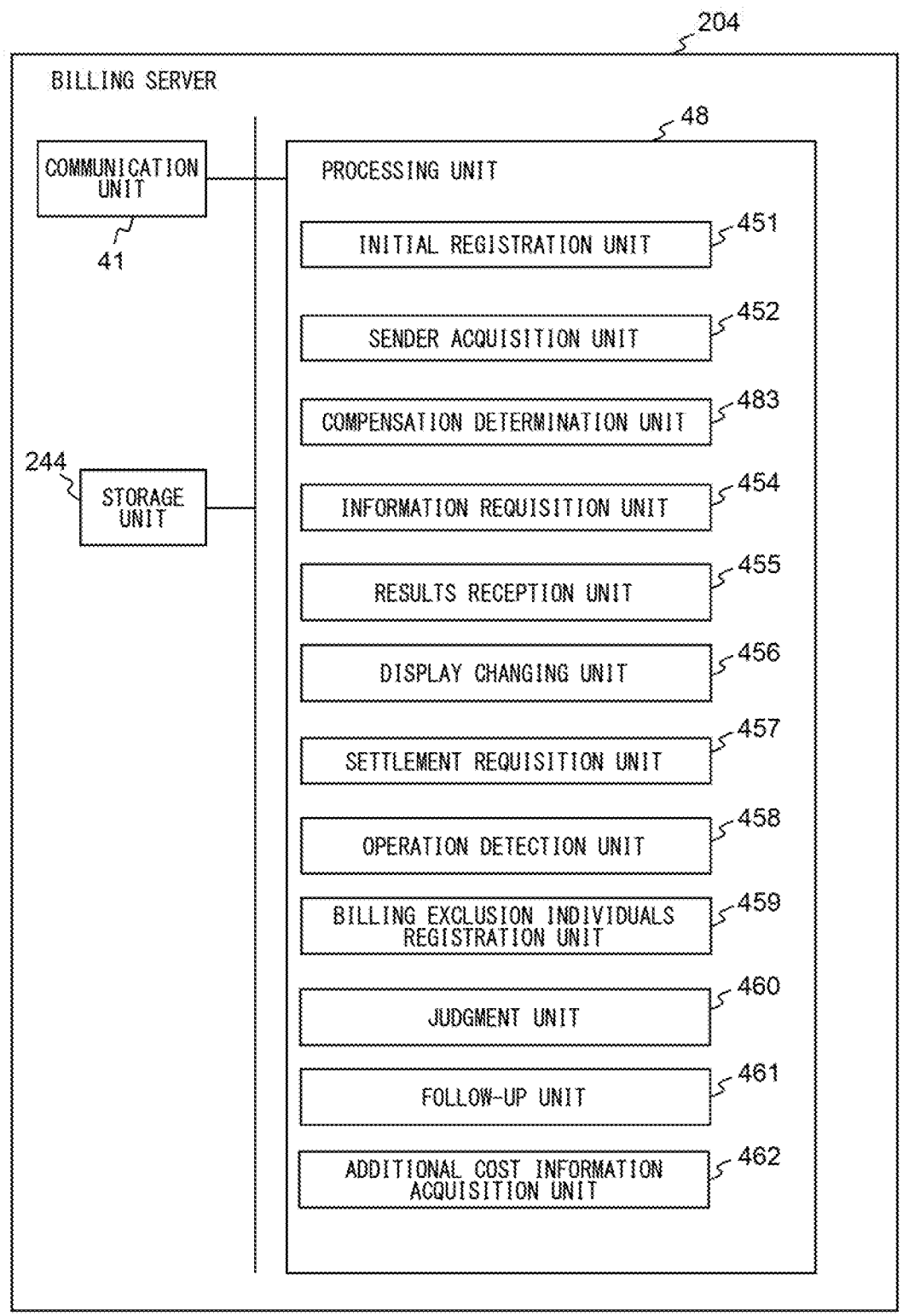
FIG. 20 is a view showing an example of the schematic structure of a billing server 204 according to a second modification.

FIG. 20 is a view showing an example of the schematic structure of the billing server 204 according to the second modified example.

The billing server 204 differs from the billing server 104 according to the first modified example in that the storage unit 244 further stores an additional cost table, the processing unit 48 further includes an additional cost information acquisition unit 462, and a part of the contents of the process of the compensation determination unit 483 differs. The structures and functions of the constitute elements of the billing server 204 aside from the foregoing are identical to the structures and functions of the constituent elements of the billing server 104 which have been assigned the same reference signs, and thus, detailed descriptions thereof have been omitted herein.

FIG. 21 is a view showing an example of the additional cost table according to the second modified example.

The additional cost table stores the sender address, recipient address, and additional cost information in association with each other. The sender address represents the email address of the sender of the target email. The recipient address represents the email address of the recipient of the target email. The additional cost information represents costs paid by the sender of the target email specified by the sender address in order for the billing server 204 to transmit a follow-up email to the target email to the recipient address.

Since the initial registration operation sequence according to the second modified example is identical to the initial registration operation sequence according to the first modified example, a detailed description thereof has been omitted herein.

Figure 22:
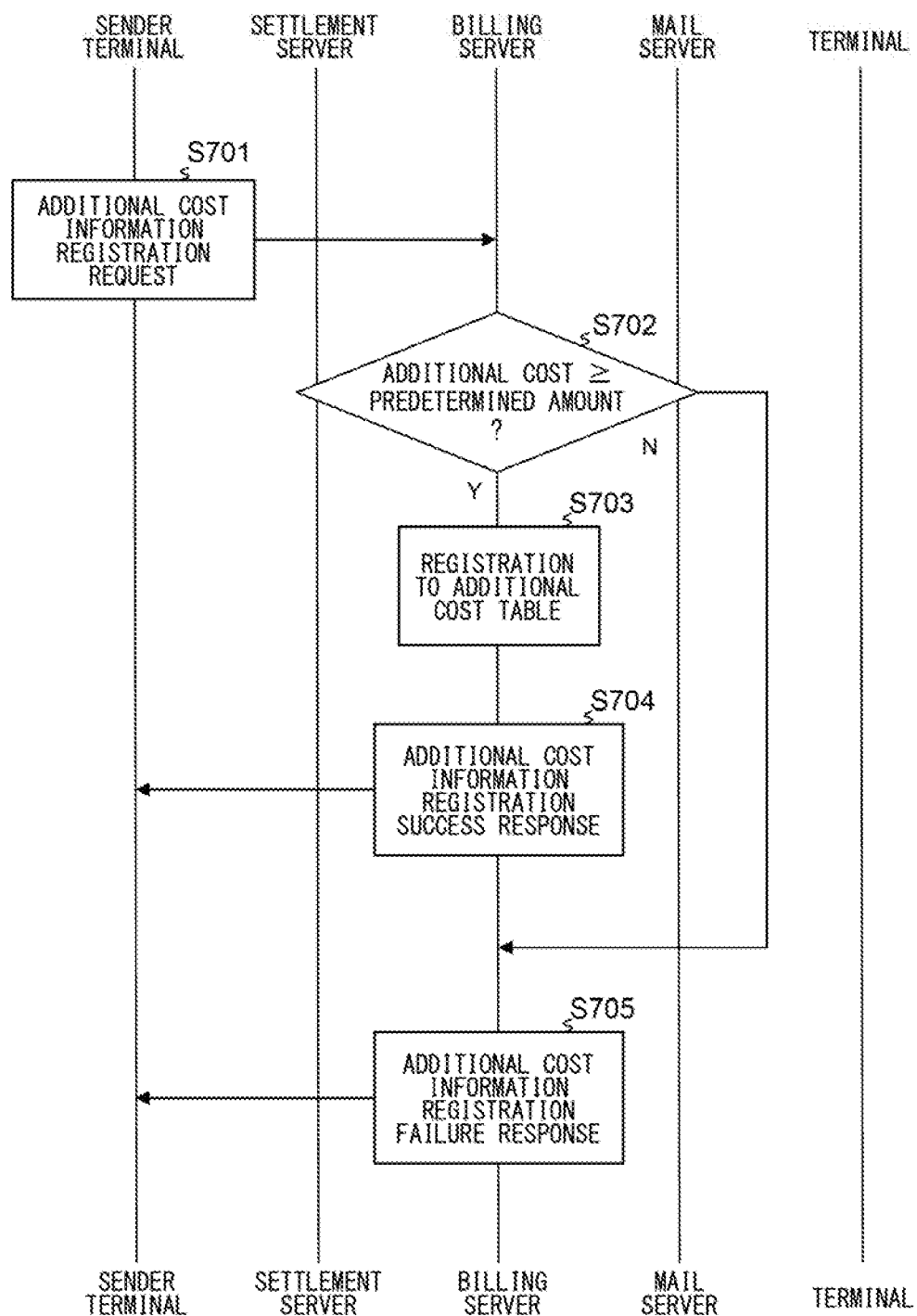
FIG. 22 is a view showing an example of an additional cost registration operation sequence according to the second modification.

FIG. 22 is a view showing an example of the operation sequence of additional cost registration according to the second modified example.

The operation sequence of additional cost registration is executed after the initial registration sequence has been executed but before the sequence of the process when an email arrives. Initially, the sender terminal 2, in accordance with the instructions from the user, transmits an additional cost information registration request representing costs to be paid by the email sender for transmitting a follow-up email to the billing server 204 (S701). The registration request is transmitted to the billing server 204 as a message containing information representing additional cost information registration, the email address of the sender of the email, the email address of the recipient of the email, and the additional cost information.

Next, the additional cost information acquisition unit 462 of the billing server 4 receives the registration request transmitted from the sender terminal 2 via the communication unit 41. When it is detected that the information representing additional cost information registration is contained in a registration request, the additional cost information acquisition unit 462 judges whether the cost indicated by the additional cost information is equal to or greater than a predetermined cost stored in the storage unit 244 in advance (S702).

When the cost indicated by the additional cost information is greater than or equal to the predetermined cost, the additional cost information acquisition unit 462 acquires the email address of the sender of the email, the email address of the recipient of the email, and the additional cost information from the registration request. Next, the additional cost information acquisition unit 462 registers the acquired information in the additional cost table in association with each other (S703). Next, the additional cost information acquisition unit 462 transmits an additional cost registration response containing information indicating that the additional cost information registration was successful to the sender terminal 2 via the communication unit 41 (S704). In accordance with the foregoing, the additional cost registration sequence ends.

When the cost indicated by the additional cost information is not greater than or equal to the predetermined cost, the additional cost information acquisition unit 462 transmits an additional cost registration response containing information indicating that the additional cost information registration has failed to the sender terminal 2 via the communication unit 41. In accordance with the foregoing, the additional cost registration sequence ends.

Figure 23:
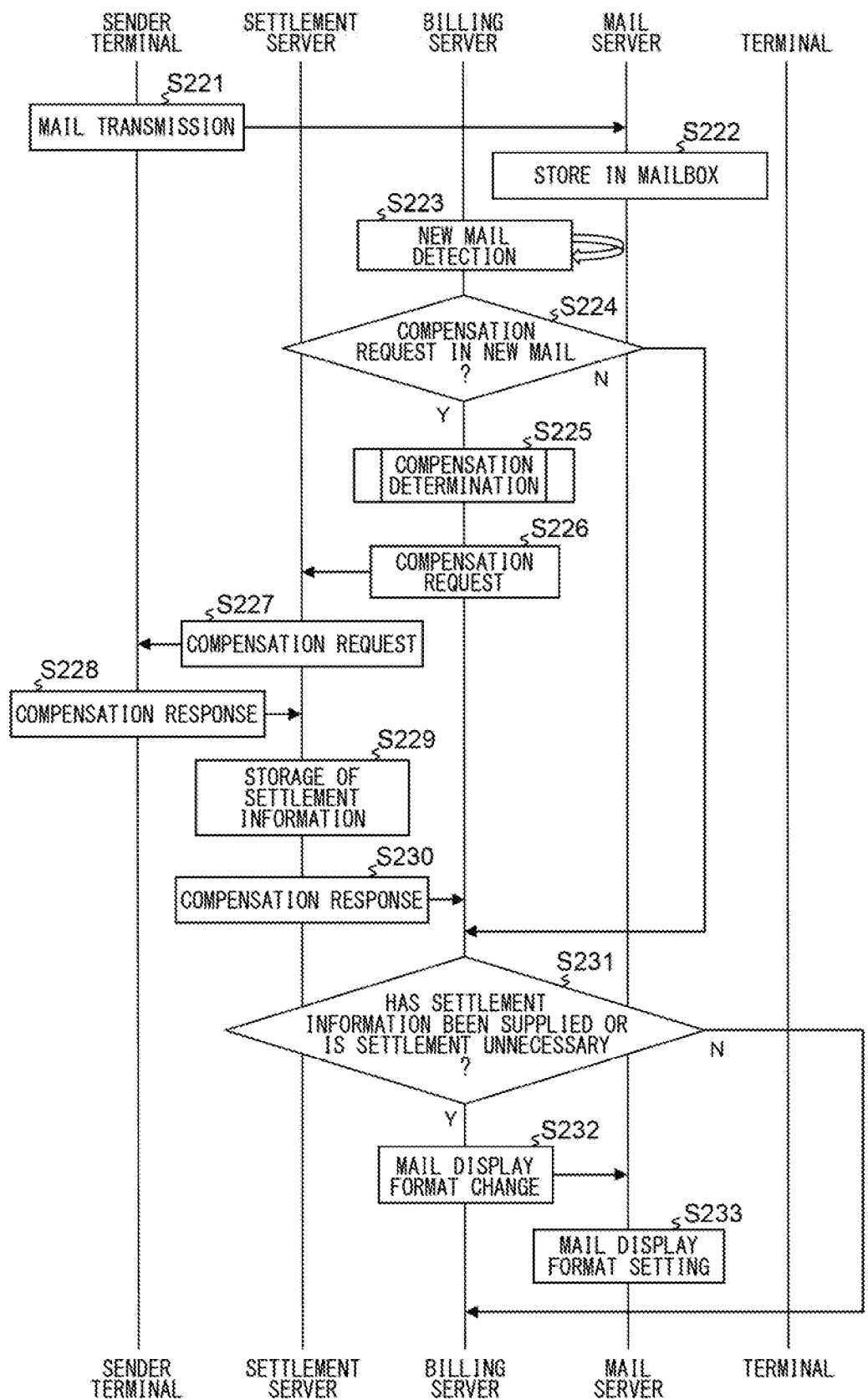
FIG. 23 is a view showing an example of a processing operation sequence when an email arrives according to the second modification.

FIG. 23 is a view showing an example of the operation sequence of the process when an email arrives according to the second modified example.

Since the processes of S211 to S224 are identical to the processes of S201 to S204 of the process when an email arrives according to the first modified example, detailed descriptions thereof have been omitted herein.

When compensation is requested from the email sender (S244—Y), the compensation determination unit 483 of the billing server 4 executes the compensation determination process (S225). The details of the process of S225 are described later. When compensation is not requested from the email sender (S224—N), the process proceeds to S231.

Since the processes of S226 to S233 are identical to the processes of S206 to S213 of the process when an email arrives according to the first modified example, detailed descriptions thereof have been omitted herein. In accordance with the foregoing, the operation sequence of the process when an email arrives ends.

Figure 24:
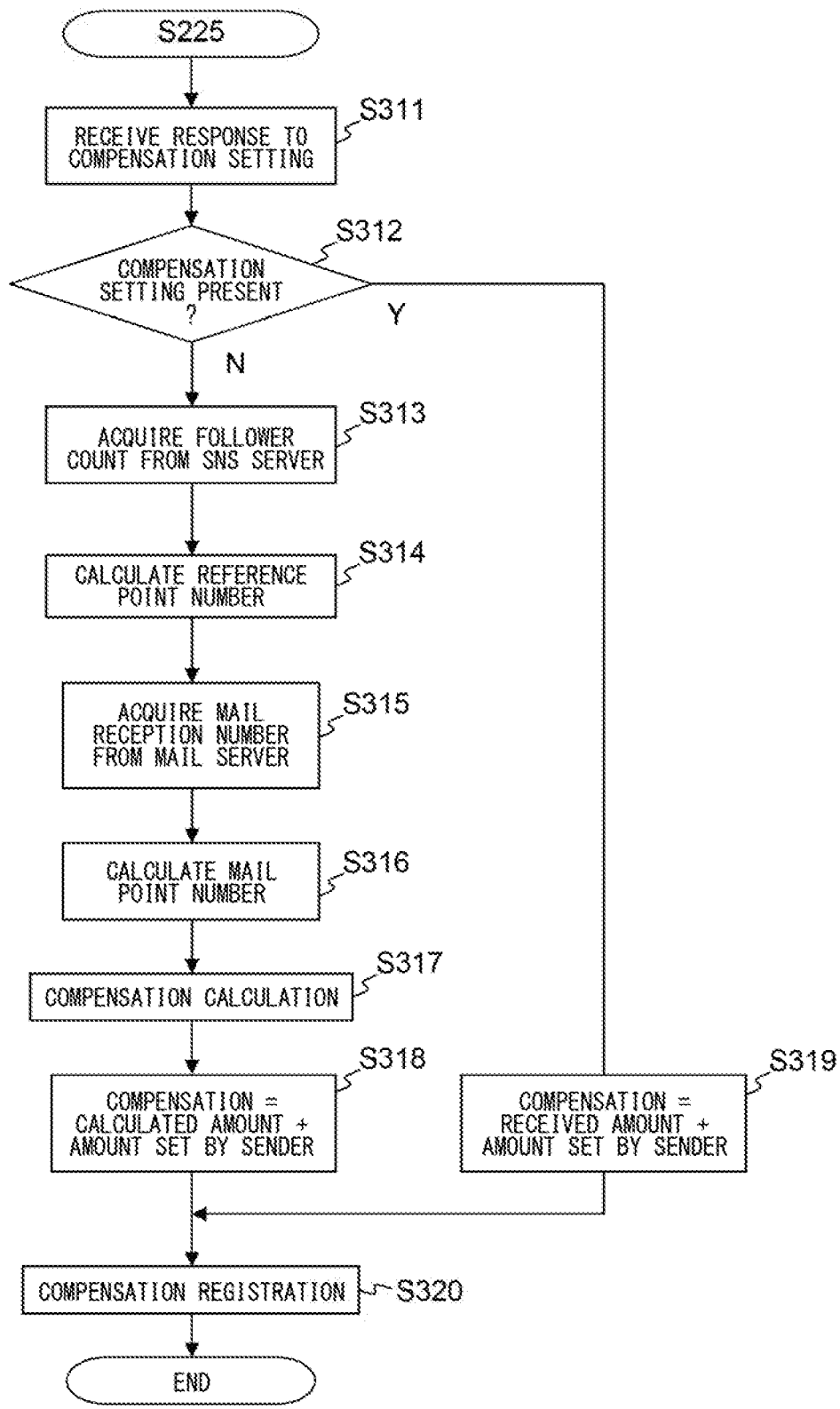
FIG. 24 is a flowchart illustrating an example of compensation determination processing according to the second modification.

FIG. 24 is a flowchart showing an example of the compensation determination process according to the second modified example.

The process of the flowchart of FIG. 24 corresponds to the process of S225 of FIG. 23, and is executed when it is judged by the sender acquisition unit 452 in the process of S224 that compensation is to be requested.

The processes of S311 to S317 and S320 are identical to the processes of S301 to S308 of the process for determining compensation according to the first modified example excluding execution by the compensation determination unit 483 in place of the compensation determination unit 453, and thus, a detailed description thereof has been omitted herein.

After the process of S317, the compensation determination unit 483 determines a new compensation charge based on the amount of the compensation calculated by the compensation determination unit 483 and the amount set by the email sender (S318). The compensation determination unit 483 adds the compensation amount calculated by the compensation determination unit 483 and the amount indicated in the additional cost information registered in the additional cost table in the process of S703, and sets the added amount as the new compensation amount.

When S312—Y, the compensation determination unit 483 determines the new compensation based on the compensation amount set by the email recipient and the amount set by the email sender (S319). The compensation determination unit 483 adds the compensation amount set by the email recipient received in the process of S311 and the amount indicated in the additional cost information registered in the additional cost table in the process of S703, and sets the added amount as the new compensation amount.

Next, the compensation determination unit 483 registers the new compensation in the message table (S320). The process of S320 is identical to the process of S308 of the process for determining the compensation according to the first modified example except for execution by the compensation determination unit 483 in place of the compensation determination unit 453, and thus, a detailed description thereof has been omitted herein. In accordance with the foregoing, the compensation determination process ends.

The compensation amount registered in the message table in the process of S320 calculated in the process of S318 or S319 is based on an amount corresponding to the additional cost. The compensation amount registered in the message table is used in the settlement of the process of S539, and the execution of settlement in the process of SS39 is one of the conditions for transmitting the follow-up mail as shown in the process of S601 in the follow-up mail process of S543. Thus, when the email sender pays a predetermined amount, the billing server 204 according to the second modified example transmits a follow-up mail to the email recipient by satisfying other conditions.

Note that when the registration request transmitted in the process of S701 is received, the additional cost information acquisition unit 462 may execute registration in the additional cost table without judging whether or not the amount indicated in the additional cost information contained in the registration request is greater than or equal to a predetermined amount. In this case, the judgment unit 460 judges whether the amount indicated in the additional cost information contained in the registration request in the follow-up mail process of S543 is equal to or greater than the predetermined amount, and when it is not greater than or equal to the predetermined amount, the follow-up unit 461 does not transmit a follow-up email.

Furthermore, the additional cost information acquisition unit 462 may register the email address of the sender and recipient of the email and the additional cost information in the additional cost table by another process in place of registration in the additional cost table in the processes of S701 to S705.

For example, in the process of S101 of the sender registration operation sequence, the sender terminal 2 further includes the email address of the email recipient and the additional cost information in the message transmitted to the billing server 4. The initial registration unit 451 of the billing server 4 registers the email address of the email sender, the email address of the email recipient, and the additional cost information in association with each other in the additional cost table.

Furthermore, for example, in the process of S228, the sender terminal 2 includes the additional cost information in the compensation response transmitted to the settlement server 5, and in the process of S230, the settlement server 5 includes the received additional cost information in the compensation response transmitted to the billing server 204. The results reception unit 455 of the billing server 204 registers the email address of the email sender and the email address of the email recipient acquired ater the process of S223, as well as the received additional cost information in association with each other in the additional cost table.

Furthermore, when the additional cost information is received from the sender terminal 2, the additional cost information acquisition unit 462 may transmit a request to secure the amount indicated by the additional cost information as a credit line, and the credit line may be settled by the settlement server 5. In the process of S539, the settlement server 5 can reliably pay the amount indicated in the additional cost information to the recipient of the target email by executing settlement with the amount indicated by the secured credit line as a part of the settlement amount.

Furthermore, in the process of S318, the compensation determination unit 483 may determine a new compensation amount based on the compensation amount set by the email recipient, the compensation amount calculated by the compensation determination unit 483, and the amount set by the email sender. For example, in the compensation determination process shown in FIG. 24, the compensation determination unit 483 may execute the processes of S313 to S317 when the compensation is indicated in the response received in the process of S311. In the process of S318, the compensation determination unit 483 sets the sum of the compensation amount set by the email recipient, the compensation amount calculated by the compensation determination unit 483, and the amount set by the email sender as the new compensation amount.

Furthermore, in place of indicating the amount to be paid by the sender of the target email, the additional cost information may indicate whether or not a fee is to be paid in order for the sender of the target email to transmit a follow-up mail. In this case, in place of the process of S318 in the compensation determination process shown in FIG. 24, the compensation determination unit 483 may judge whether or not the additional cost information indicates that a fee is to be paid. When the additional cost information indicates that a fee is to be paid, the compensation determination unit 483 determines a new compensation amount based on the compensation amount set by the email recipient or the compensation amount calculated by the compensation determination unit 483, as well as the predetermined amount stored in the storage unit 244 in advance.

Furthermore, when the additional cost information indicates whether the sender of the target email is to pay a fee, prior to the process of S601, the judgment unit 460 judges whether the additional cost information indicates that the sender of the target email is to pay a fee. Referring to the additional cost table, the judgment unit 460 acquires the additional cost information associated with the target email sender and target email recipient pair, and judges whether the additional cost information indicates that a fee is to be paid. When the additional cost information indicates that a fee is to be paid, the judgment unit 460 advances the process to S601, and when the additional cost information does not indicate that a fee is to be paid, the follow-up mail process ends.

A person skilled in the art could understand that various changes, replacements and modifications can be made without deviating from the spirit and scope of the present invention.

REFERENCE SIGNS LIST 1 billing system
4, 104, 204 billing server
5 settlement server
6 mail server
452 sender acquisition unit
453,483 compensation determination unit
454 information requisition unit
455 results reception unit
456 display changing unit
457,477 settlement requisition unit
458 operation detection unit
459 billing exclusion individuals registration unit
460 judgment unit
461 follow-up unit
462 additional cost information acquisition unit

The invention claimed is:
1. A billing server, comprising:
a processor; and
a memory coupled to the processor and storing a computer program executed by the processor,
wherein the processor is configured, by the computer program, to:
detect that a mail server has received an email and acquire a sender of the email;
determine compensation to be requested from the sender, based on an SNS follower count of the recipient of the email or the number of prior emails received by the recipient of the email;
request that the sender input information necessary for settlement of the compensation to a settlement server;
receive result of the request for information;
control the mail server to change a display prior to opening of the email to a predetermined display format when result indicating that the information has been supplied is received;
detect, via the mail server, opening of the email or an operation executed on the email after opening; and request that the settlement server execute the settlement when result indicating that the information has been supplied is received and it is detected that the opening of the email or the operation executed on the email after opening has been executed.

2. The billing server according to claim 1, wherein the processor is further configured to:
register, based on a request by a recipient of the email, the sender and the recipient as a pair; and
exclude emails having a sender and recipient pair identical to the pair registered from the request for information necessary for the settlement of the compensation.

3. The billing server according to claim 1, wherein the processor is further configured to receive, via the settlement server, result of the request for information necessary for the settlement of the compensation.

4. The billing server according to claim 1, wherein the processor is further configured to:
receive a settlement response indicating execution of the settlement from the settlement server;
judge whether a reply mail to the email has been transmitted by the recipient of the email by a predetermined time; and
transmit a follow-up mail which prompts a reply to the email, to the recipient when the settlement response has been received, the predetermined operation is opening of the email and the reply mail has not been transmitted by the recipient by the predetermined time.

5. The billing server according to claim 4, wherein the processor is further configured to determine at least one of a frequency and interval of transmission of the follow-up mail based on an SNS follower count of the recipient.

6. The billing server according to claim 4, wherein the processor is further configured to:
acquire additional cost information representing a cost paid by the sender of the email for the transmission of the follow-up email; and
determine the compensation to be requested from the sender based on at least one of a compensation amount set by the recipient of the email and a compensation amount calculated, and a cost corresponding to the additional cost information.

7. A billing method executed by a billing server, comprising:

detecting that a mail server has received an email and acquiring a sender of the email;
determining compensation to be requested from the sender, based on an SNS follower count of the recipient of the email or the number of prior emails received by the recipient of the email;
requesting that the sender input information necessary for settlement of the compensation to a settlement server;
receiving result of the request for information;
controlling the mail server to change a display prior to opening of the email to a predetermined display format when result indicating that the information has been supplied is received;
detecting, via the mail server, opening of the email or an operation executed on the email after opening; and
requesting that the settlement server execute the settlement when result indicating that the information has been supplied is received and it is detected that the opening of the email or the operation executed on the email after opening has been executed.

8. A computer-readable, non-transitory medium storing a computer program, wherein the computer program causes a billing server to execute a process, the process comprising:
detecting that a mail server has received an email and acquiring a sender of the email;
determining compensation to be requested from the sender, based on an SNS follower count of the recipient of the email or the number of prior emails received by the recipient of the email;
requesting that the sender input information necessary for settlement of the compensation to a settlement server;
receiving result of the request for information;
controlling the mail server to change a display prior to opening of the email to a predetermined display format when result indicating that the information has been supplied is received;
detecting, via the mail server, opening of the email or an operation executed on the email after opening; and
requesting that the settlement server execute the settlement when result indicating that the information has been supplied is received and it is detected that the opening of the email or the operation executed on the email after opening has been executed.

* * * * *